United States Patent
Sun et al.

(10) Patent No.: US 9,113,371 B2
(45) Date of Patent: Aug. 18, 2015

(54) CROSS-LAYER OPTIMIZATION FOR NEXT-GENERATION WIFI SYSTEMS

(75) Inventors: Jiatong Sun, Hong Kong (CN); Vincent Kin Nang Lau, Hong Kong (CN)

(73) Assignee: The Hong Kong University of Science and Technology, Kowloon (HK)

( * ) Notice: Subject to any disclaimer, the term of this patent is extended or adjusted under 35 U.S.C. 154(b) by 786 days.

(21) Appl. No.: 13/173,251

(22) Filed: Jun. 30, 2011

(65) Prior Publication Data
US 2012/0002567 A1    Jan. 5, 2012

Related U.S. Application Data

(60) Provisional application No. 61/344,339, filed on Jul. 1, 2010.

(51) Int. Cl.
| | |
|---|---|
| H04L 12/26 | (2006.01) |
| H04W 28/16 | (2009.01) |
| H04L 12/911 | (2013.01) |
| H04L 5/00 | (2006.01) |
| H04L 12/54 | (2013.01) |
| H04L 29/08 | (2006.01) |
| H04W 24/00 | (2009.01) |
| H04W 28/04 | (2009.01) |

(Continued)

(52) U.S. Cl.
CPC ............ *H04W 28/16* (2013.01); *H04L 5/0035* (2013.01); *H04L 12/5695* (2013.01); *H04L 47/78* (2013.01); *H04L 69/32* (2013.01); *H04W 24/00* (2013.01); *H04W 28/04* (2013.01); *H04W 28/06* (2013.01); *H04W 28/18* (2013.01); *H04W 72/02* (2013.01); *H04W 88/08* (2013.01)

(58) Field of Classification Search
CPC ....... H04L 47/78; H04L 47/781; H04L 47/70; H04L 12/5695; H04L 5/0058
USPC ......... 370/437, 255, 343, 348, 302, 230, 231, 370/236.1, 235; 700/47
See application file for complete search history.

(56) References Cited

U.S. PATENT DOCUMENTS

| | | | | |
|---|---|---|---|---|
| 5,485,631 A | * | 1/1996 | Bruckert | ........................ 455/446 |
| 6,111,867 A | * | 8/2000 | Mann et al. | .................... 370/337 |

(Continued)

OTHER PUBLICATIONS

N. Golmie, "Interference in the 2.4 GHz ISM Band: Challenges and Solutions", International workshop on services and Applications in the Wireless Public Infrastructure, 2005.

(Continued)

*Primary Examiner* — Ricky Ngo
*Assistant Examiner* — Dewanda Samuel
(74) *Attorney, Agent, or Firm* — Amin, Turocy & Watson, LLP

(57) ABSTRACT

Systems, methods, and apparatus are described that that increase throughput of a WiFi network. A first method is provided wherein access points monitor and keep track of their states on each resource block (frequency channel and antenna pattern) associated therewith and dynamically select the resource blocks that increase network throughput based on the instantaneous states of the access points. A second method is provided comprising employing Q-learning to determine one or more modifications of operating parameters of a network node based on observed throughput of the network and implementing the one or more modifications at the node. A third method is also provided which combines the first and second methods so as to increase network throughput at both the physical layer and the MAC layer.

34 Claims, 20 Drawing Sheets

(51) Int. Cl.
*H04W 28/06* (2009.01)
*H04W 28/18* (2009.01)
*H04W 72/02* (2009.01)
*H04W 88/08* (2009.01)

(56) References Cited

U.S. PATENT DOCUMENTS

| | | | | |
|---|---|---|---|---|
| 7,206,586 | B2* | 4/2007 | Kim et al. | 455/450 |
| 7,257,410 | B2* | 8/2007 | Chun et al. | 455/455 |
| 7,729,307 | B2* | 6/2010 | Legg | 370/329 |
| 7,738,374 | B2* | 6/2010 | Yagyu et al. | 370/232 |
| 7,848,759 | B2* | 12/2010 | Kim et al. | 455/453 |
| 7,983,172 | B2* | 7/2011 | Zhu et al. | 370/241 |
| 8,224,252 | B2* | 7/2012 | Feng et al. | 455/63.1 |
| 8,238,249 | B2* | 8/2012 | Kazmi et al. | 370/237 |
| 2004/0199668 | A1* | 10/2004 | Lin et al. | 709/241 |
| 2005/0208949 | A1* | 9/2005 | Chiueh | 455/452.2 |
| 2006/0268906 | A1* | 11/2006 | Kneckt | 370/401 |
| 2008/0004033 | A1* | 1/2008 | Tiedemann et al. | 455/453 |
| 2010/0029282 | A1* | 2/2010 | Stamoulis et al. | 455/436 |
| 2012/0202509 | A1* | 8/2012 | Han et al. | 455/450 |
| 2013/0150035 | A1* | 6/2013 | Chande et al. | 455/435.1 |

OTHER PUBLICATIONS

A. J. Paulraj, C. B. Papadias, "Space-Time Processing for Wireless Communications", IEEE Personal Communications, vol. 14, No. 5, pp. 48-83, Nov. 1997.

Madhow, U, Blind adaptive interference suppression for direct-sequence CDMA, Proceedings of the IEEE, vol. 86, Issue: 10, pp. 2049-2069, Oct. 1998.

Nilsson, R. Sjoberg, F. Leblanc, J.P., A rank-reduced LMMSE canceller for narrowband interference suppression in OFDM-based systems, IEEE Transactions on Communications, vol. 51, Issue: 12, pp. 2126-2140, Dec. 2003.

L. C. Godara, "Applications of Antenna Arrays to Mobile Communications, Part I: Performance Improvement, Feasibility, and System Considerations", Proceedings of IEEE, vol. 85, No. 7, pp. 1031-1060, Jul. 1997.

L. C. Godara, "Applications of Antenna Arrays to Mobile Communications Part II—Beam-forming and Direction of Arrival Considerations", Proceedings of IEEE, vol. 85, No. 7, pp. 1195-1245, Jul. 1997.

Joseph C. Liberti, et al., "Smart Antennas for Wireless Communications: IS-95 and Third Generation CDMA Applications". Abstract from the Book. Prentice Hall PTR Upper Saddle River, NJ, USA. 1999.

A. Kamerman, "Coexistence between Bluetooth and IEEE 802.11 CCK: Solutions to avoid mutual interference", IEEE 802.11 Working Group Contribution, IEEEP802.11-00/162r0, Jul. 2000.

B. Treister, A. Batra, K.C. Chen, O. Eliezer, Adaptive Frequency Hopping: A non-collaborative Coexistence mechanism, IEEE P802.15 Working Group Contribution, IEEE P802.15-01/252r0, Orlando FL, May 2001.

I. Howitt, V. Mitter, J. Gutierrez, Empirical Study for IEEE 802.11 and Bluetooth Interoperability, IEEE Vehicular Technology Conference (VTC), Spring 2001.

S. Shellhammer, "Packet Error Rate on an IEEE802.11 WLAN in the presence of Bluetooth", IEEE802.15 Working Group Contribution, IEEE P802.15-00/133r0, Seatle, May 2000.

* cited by examiner

CROSS-LAYER OPTIMIZATION FOR NEXT-GENERATION WIFI SYSTEMS

PRIORITY CLAIM

This application claims priority to U.S. Provisional Patent Application Ser. No. 61/344,339 filed on Jul. 1, 2010, entitled "CROSS-LAYER OPTIMIZATION FOR NEXT-GENERATION WiFi SYSTEMS." The entirety of the aforementioned application is incorporated by reference herein.

TECHNICAL FIELD

This disclosure relates generally to wireless communications in connection with a wireless fidelity (WiFi) system e.g., including optimizing throughput of a WiFi system.

BACKGROUND

WiFi systems face a variety of unique challenges. For example multiple factors effect throughput of a WiFi system, including but not limited to: complex interference in the Industrial, Scientific and Medical (ISM) spectrum, poor spectral efficiency of 802.11 media access control protocol (MAC), and starvation problems associated with hidden nodes and exposed nodes.

If we imagine the public WiFi system as a complex and giant system, the system will produce some "performance outputs" (such as the overall system capacity, the overall system coverage, etc.) based on some "control inputs." For example, control inputs can include the operating frequency of various access points, instantaneous beam index, the instantaneous transmit data rate, transmit MIMO mode (spatial mux or spatial div), the instantaneous transmit power, and the carrier sensing threshold. Such a system will also exhibit some "observations" including for example, traffic load data, transmission data, and ACK/NAK flows.

Conventional WiFi systems are similar to an "open loop" system in the sense that the control inputs (such as the operating channel, beam, transmit power, carrier sensing thresholds) are pre-configured and remain static. However, the dynamics of the WiFi environment are time varying and random. For example, randomness is driven by channel fading, bursty traffic arrival, and random interference. As a result, the existing "open-loop" approach (static approach) for running conventional WiFi systems is sub-optimal as the "control inputs" fail to exploit the random and time varying "system states" of the WiFi system.

In addition, there are various important parameters in the 802.11 MAC that could be optimized so as to enhance the spectral efficiency of the 802.11 MAC layer. They are namely the transmit rate, the transmit power as well as the carrier sense threshold. However, existing techniques regarding rate adaptation are based only on heuristic approaches. Since the rate adaptation loop in previous approaches is driven by ACK/NAK feedback, it suffers from the disadvantage of slow response. There is no power control implemented or carrier sensing threshold adaptation in most of the WiFi systems available today. Furthermore, existing techniques fail to exploit the unique features of the MIMO physical layer.

Unlike the resource optimization problems in cellular networks that operate in the licensed spectrum, the optimization problem for WiFi systems is very tricky and challenging due to the distributive implementation of 802.11. The IEEE 802.11 MAC protocol uses the CSMA (listen-before-talk) mechanism to resolve potential conflicts in channel access. To allow for robust operation, in fact, it has been shown that the power of the advanced MIMO technology in 802.11n WiFi systems cannot be fully unleashed without proper optimization at the MAC layer.

The above-described deficiencies of conventional WiFi optimization network techniques are merely intended to provide an overview of some of problems of current technology, and are not intended to be exhaustive. Other problems with the state of the art, and corresponding benefits of some of the various non-limiting embodiments described herein, may become further apparent upon review of the following detailed description.

SUMMARY

The following presents a simplified summary to provide a basic understanding of some aspects described herein. This summary is not an extensive overview of the disclosed subject matter. It is not intended to identify key or critical elements of the disclosed subject matter, or delineate the scope of the subject disclosure. Its sole purpose is to present some concepts of the disclosed subject matter in a simplified form as a prelude to the more detailed description presented later.

To correct for the above noted deficiencies of conventional WiFi network optimization techniques and other drawbacks of current network WiFi technologies, various systems, methods, and apparatus described a robust, practical and low complexity control algorithm that drives the WiFi system in a "closed-loop manner" so as to exploit the dynamic variation of interference and bursty traffic. In the dynamic MAC layer, a theory of "multi-agent learning" is employed to derive a robust, distributive and scalable joint rate, power, MIMO mode as well as CSMA threshold adaptive algorithm over the microscopic time scale (packet level) to take advantage of the advanced MIMO PHY layer to boost the spectral efficiency of the 802.11 MAC as well as alleviate the issues of starvation.

According to an embodiment, provided is a method comprising classifying, by a computing device, as normal, interfered, or heavily loaded, access points under resource blocks respectively associated with the access points, selecting a subset of the resource blocks that facilitate increasing a percentage of access points having a normal classification, wherein respective resource blocks of the subset comprise a selected resource block for respective ones of the access points and assigning the respective ones of the access points to the respective selected resource block. In an aspect, the method further comprises measuring samples of performance parameters for the access points under the resource blocks associated therewith, and employing the samples in the classifying.

According to another embodiment, provided is a method comprising measuring samples of performance parameters for access points under a plurality of resource blocks associated with a selected access point included in the access points, classifying the access points as normal, interfered, or heavily loaded under the plurality of resource blocks respectively associated with the selected access point based on the samples, and setting the selected access point to a resource block of the plurality of resource blocks that facilitates increasing the percentage of access points classified as normal. In an aspect, the classifying includes employing stepwise optimal hierarchical clustering.

In another aspect, a system is provided comprising a classification component configured to classify as normal, interfered, or heavily loaded, access points under resource blocks respectively associated with the access points, and an optimization component configured to select a subset of the resource blocks that facilitate increasing the percentage of access points having a normal classification, wherein the subset of the resource blocks comprises a selected resource block for each access point respectively and the optimization component is further configured to assign the access points to the selected resource block associated therewith.

According to another embodiment, provided is method comprising employing Q-learning to determine one or more modifications of operating parameters of a wireless fidelity (WiFi) network node based on observed throughput of a WiFi network, and implementing the one or more modifications at the node. The method further comprising identifying a starvation scenario of the WiFi network, determining heuristic probabilities associated with probable modifications of operating parameters that alleviate the starvation scenario, and using the heuristic probabilities to determine the one or more modifications of operating parameters of the node.

In another aspect, a system is provided comprising a learner component configured to employ Q-learning to determine one or more modifications of operating parameters of a wireless fidelity (WiFi) network node based on observed throughput of a WiFi network and implement the one or more modifications at the node. In an aspect, the system further comprises a scenario component configured to identify a starvation scenario of the WiFi network, and a heuristic component configured to determine heuristic probabilities associated with probable modifications of operating parameters that alleviate the starvation scenario, wherein the learner component is further configured to use the heuristic probabilities to determine the one or more modifications of operating parameters of the node.

Further provided is a method comprising classifying as normal, interfered, or heavily loaded, access points under resource blocks associated with each of the access points included in the set, wherein the access point are part of a wireless fidelity (WiFi) network, dynamically selecting an optimal resource block for each of the access points that facilitate increasing the number of access points having a normal classification, and employing Q-learning to adjust operating parameters of a network node based on current throughput and a current scenario.

The following description and the annexed drawings set forth in detail certain illustrative aspects of the disclosed subject matter. These aspects are indicative, however, of but a few of the various ways in which the principles of the innovation may be employed. The disclosed subject matter is intended to include all such aspects and their equivalents. Other advantages and distinctive features of the disclosed subject matter will become apparent from the following detailed description of the innovation when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
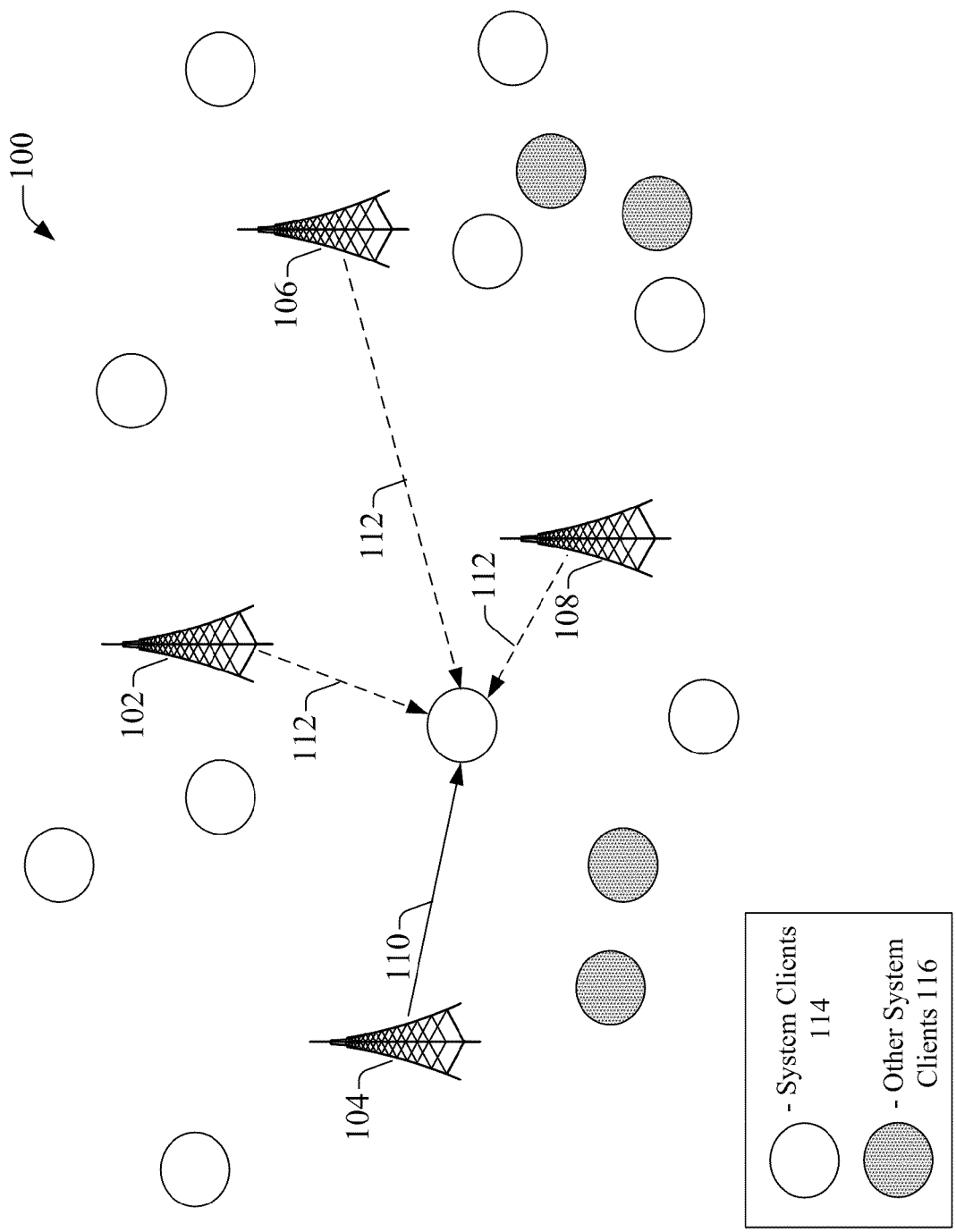
FIG. 1 illustrates a schematic example of a WiFi network environment in accordance with an embodiment.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, by scenario identification component $1104$ (see below) to infer a starvation scenario present in a WiFi network in real-time. Furthermore, the artificial intelligence system can be used, by heuristic component $1106$ (see below), to automatically determine heuristic probabilities associated with possible modifications to operating parameters that could alleviate an identified starvation scenario.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

FIG. 1 is a schematic example of a WiFi network environment $100$ that can operate in accordance with aspects described herein. In particular, example network environment $100$ illustrates a set of access points (APs) $102$-$108$. It should be appreciated that while four access points are presented, system $100$ can include any number of access points. As used herein, a "set" of N system access points are collectively referred to as U. System client nodes are represented by open circles $114$ while other system client nodes are represented by shaded circles $116$. As used herein, a "set" L client nodes in the network is denoted as V. System $100$ can include any number of system client nodes and other system client nodes. Other system clients are responsible for network degradation caused by a phenomenon known as heavily loaded.

The symbol E denotes a set of links between access points $102$-$108$ and clients $114$ and the symbol C denotes a set of WiFi channels which the access points can $102$-$108$ use. In an aspect, there are eleven channels in WiFi system $100$ and three of them are non-overlapping. According to another aspect, only non-overlapping channels are employed by the access points $102$-$108$. Further, in an aspect WiFi system $100$ prevents itself from other interferers such as other system clients $116$ by selecting only one least interfered channel. A link (u; v) exists between node pair u (AP) and v (client). System $110$ presents a desired link to a client $114$, and $112$ presents interfered links to a client $114$. A link is "desired," if it is selected to carry data traffic. Link selection is performed by a network layer protocol acquired in advance. In an aspect, link (u; v)∈E is desired, if it is selected to carry data traffic. Link selection is performed by a network layer protocol acquired in advance. As used herein, $E' \subseteq E$ denotes the set of active links in the network. The set of active links in the network E' is an input parameter to the topology control optimization problem discussed supra.

Each AP in the network $100$ is equipped with a multi-sector antenna consisting of s sectors and all sectors use the same one of the c channels $C=\{1, 2, \ldots, c\}$. In an aspect each AP is equipped with an antenna having four sectors. An antenna pattern is formed by activating (on/off pattern) any combination of these s sectors. The total number of antenna patterns that can be formed is $k=2^s$. Let $K=\{0, 1, \ldots, k-1\}$ denote the set of possible antenna patterns available at each node. Antenna pattern 0 denotes an all-sectors-on mode where all s sectors are enabled.

Each access point 102-108 is associated with multiple resource blocks or assignments. As used herein, the terms resource bock and assignment are used interchangeably. A resource block is a particular combination of a channel frequency and an antenna pattern for an access point. For example, assuming an access point employs three channels, and fifteen antenna patterns (four sectors, each one either on or off, with at least one on), the total number of resource blocks for the access point is forty five. As described infra, for a given resource block employed by an access point, the access point can be classified into one of three states. Further, the state of an access point at a given resource block is also affected by the states of resource blocks employed at other access point included in the same set.

The remainder of the disclosure is divided into three parts. Section I describes an interference adaptation layer which employs a novel physical layer interference (PLI) algorithm designed to increase WiFi network throughput on a macroscopic time scale. Section II describes a media access control platform which employs a novel media access control layer efficiency algorithm (MACLE) which operates on a microscopic time scale to increase WiFi network throughput. Section III presents a method of increasing network throughput on both the physical layer and the MAC layer by employing both PLI algorithm and the MACLE algorithm at the same time.

Section I—PLI

Figure 2:
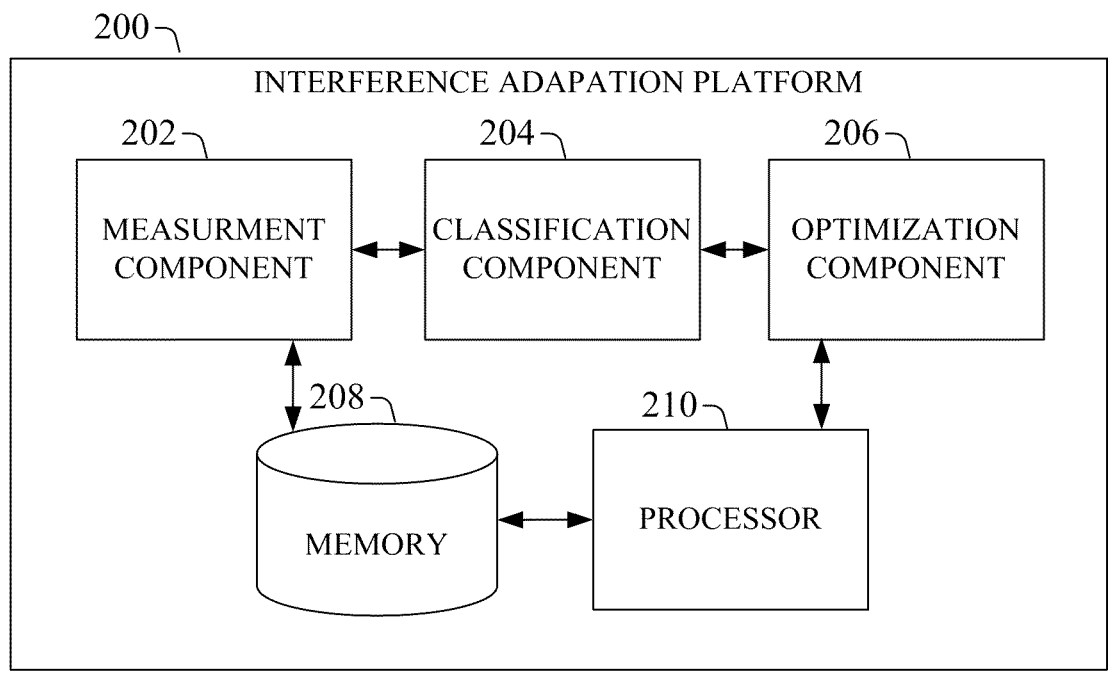
FIG. 2 illustrates a block diagram of an interference adaptation platform, in accordance with another embodiment.

Referring now to FIG. 2, presented is a block diagram of an interference adaptation platform 200 in accordance with aspects of the disclosure. Interference adaptation platform 200 employs a novel control algorithm, herein referred to as the physical layer interference (PLI) algorithm which operates at a macroscopic time scale (involving plenty of WiFi access points) to exploit the temporal, frequency and spatial burstiness in the Industrial, Scientific and Medical (ISM) interference profile over the Public WiFi networks. The PLI algorithm is self-configurable works to increase network capacity and Quality of Service (QoS) performance. Unlike previous solutions, the PLI algorithm works in a "closed-loop" manner, employs a measurement-based optimization framework, and operates at macroscopic time scale for topology control in WiFi infrastructure networks, for example, network 100 of FIG. 1.

Interference adaptation platform 200 aims to satisfy a topology control optimization problem (discussed infra), where APs activate their antenna sectors (sectors on/off patterns) for each WiFi channel to optimize network capacity. In contrast to previous approaches, interference adaptation platform employs an unsupervised clustering of APs that relies on performance parameters measurements (such as noise level, channel utilization, packets error probability and busy time ratio) on multiple antenna patterns and multiple channels of each AP. The interference adaptation platform 200 then introduces a measurement protocol to measure parameters of these sectors on/off patterns for each channel and an iterative topology control protocol that uses this information.

Aspects of the transmitting interference adaptation platform 200, and other systems, apparatuses, or processes explained herein can constitute machine-executable component embodied within machine(s), e.g., embodied in one or more computer readable mediums (or media) associated with one or more machines. Such component, when executed by the one or more machines, e.g., computer(s), computing device(s), virtual machine(s), etc. can cause the machine(s) to perform the operations described.

Figure 3:
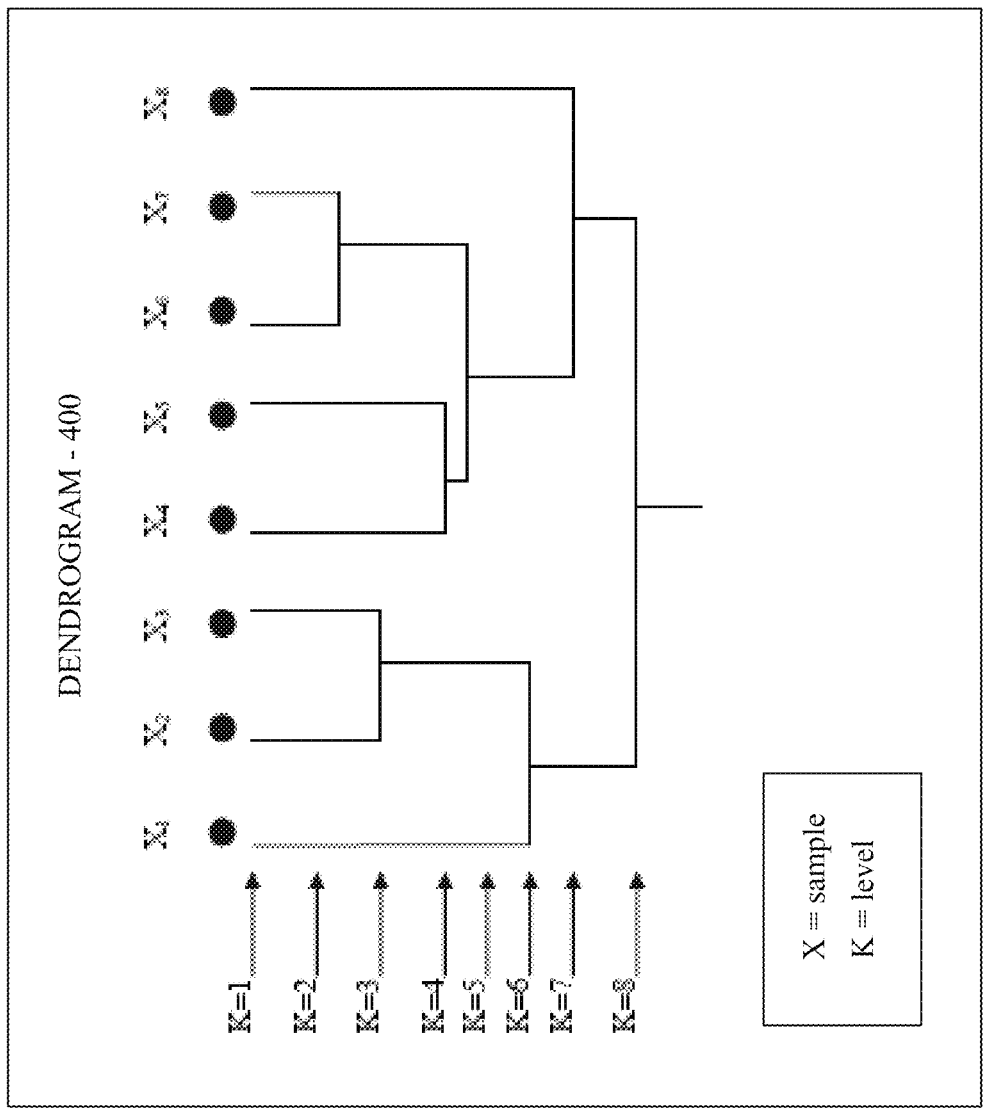
FIG. 3 illustrates a dendrogram, in accordance with an embodiment.

As seen in FIG. 3, interference adaptation platform 200 includes measurement component 202, classification component 204, optimization component 206, memory 208, and processor 210. Memory 208 holds instructions for carrying out the operations of the measurement component 202, classification component 204, and optimization component 206, when executed by processor 210. The processor 210 facilitates controlling and processing all onboard operations and functions of the interference adaptation platform 200. Memory 208 interfaces to the processor 210 for storage of data and one or more applications of the interference adaptation platform 200. The applications can be stored in the memory 208 and/or in a firmware, and executed by the processor 210 from either or both the memory 208 or/and the firmware (not shown). Each of the measurement component 202, classification component 204, and optimization component 206 are configured to perform various operations of the PLI algorithm. According to an embodiment, the interference adaptation platform is located at a network controller or management platform.

Provided below is a simplified overview of the functions of each of the components of the interference adaptation platform 200. In general, measurement component 202 is configured to attain performance parameter measurements of each access point in a set of access points necessary to classify the access point into one of three states, normal, bad, or heavily loaded. Classification component 204 is configured to employ the performance parameter measurements and utilize wise-optimal hierarchical clustering to classify each AP of the set into the one of the three states. Optimization component is configured to control determining the optimal resource block (channel frequency and antenna pattern) for each access point in the set that optimizes WiFi network performance, i.e optimizes the number of APs classified as normal and minimizes the number of APs classified as bad and heavily loaded.

Measurement component 202 will now be examined in greater depth. Measurement component 202 is configured to, under a given resource block (frequency channel, antenna pattern) for each AP in a set of APs, estimate a sample for each AP in the set representative of performance parameters. In an embodiment, the performance parameters include noise level, channel utilization, packets error probability and busy time ratio. A sample vector thus has four elements and is denoted as x=[noise level, channel utilization, packets error probability, busy time ratio]$^T$. All parameters should be average over sectors and time, also for a given resource block (channel and sector on/off pattern). Each parameter is a feature of one AP, and is an averaged value over time and the AP's associated clients.

Noise level is a summation of unwanted or disturbing energy (interference) introduced into the WiFi system from man-made and natural sources. Each sector has an average noise level over a period time of time ($T_{training}$), and each AP has an average noise level over all its sectors and over the period time of ($T_{training}$). Channel utilization, also known as bandwidth utilization efficiency, in percentage is the achieved throughput related to the net bit rate in bit/s in a channel. As with noise level, channel utilization is also an average value over all its antenna sectors and over the period time of $T_{training}$. Packets error probability is the number of incorrectly transferred data packets divided by the number of transferred packets and is also an average value over time and sectors. Busy time ratio is amount of time in which a client is communicating with an AP in a period divided by the period time and is also an average value over time and sectors.

Various methods and measurement protocol can be employed in order to obtain measurements of performance parameters including noise level, channel utilization, packets error probability and busy time ratio. In an embodiment, in order to determine the four parameters noise level, busy time ratio, packets error probability, and channel utilization, an application program interface (AIP) protocol can be employed that supplies measurements including such as sector level gathering, packet data capture, error trigger gathering, ect., in which sector noise level (dBm), sector channel busy status (%) and CCK false trigger error are needed. Next channel utilization is then attained. The parameters sector noise level, sector channel busy status, CCK false trigger error and channel utilization are all based on only one sector. Herein, those parameters should be averaged over time and sectors to get performance parameters: noise level, busy time ratio, packets error probability and channel utilization.

Under a given resource block for each AP in a set, the measurement component 202 can estimate a sample given by four parameters, noise level, channel utilization, packets error probability and busy time ratio. In an aspect, the measurement component 202 is configured to develop a complete set of "training samples" formed by samples take for each access point at each resource block. Training samples are employed in order to determine mean vectors for classification as discussed infra. Training samples are identical to samples in content, however, the term "training samples" is used herein to denote the purpose of the sample or training sample in classification discussed infra. In an aspect, training samples are used to determine mean vectors used in classification of APs into states regardless the assignment of a particular access point being evaluated. Each time a sample of an AP is measured by measurement component, it can be compiled to the training samples so as to enrich subsequent mean vector classifications. The training samples can be stored in memory 208. On the other hand, samples collected from each AP under fixed assignments of each AP, are employed to determine the classification of each AP under the state fixed assignments.

Therefore, in an aspect, prior to attempting to determine reassignment of resource blocks at each access component (as performed by the optimization component discussed infra), the measurement component 202 is configured to obtain training samples for each assignment of each AP. The process of attaining training samples may take several minutes depending on the number of APs. In order to obtain training samples, samples are taken for each AP under all resource blocks associated therewith while all other APs remain fixed to a certain resource block. Specifically, other APs' assignments will have effects on the measuring of AP's samples i.e., it is another assignment if one of the other APs' channel or sector on/off pattern is changed while measuring a particular AP. For example, $A_{P1}$ uses channe$l_1$ and sector on/off patter$_{n1}$ and other APs keep their channel and sector pattern as one assignment. Then $A_{P1}$ uses channel$_1$ and sector on/off pattern$_{n2}$ and all other APs keep their channel and sector pattern as one assignment, and so on, until $A_{P1}$ has produced training sample for each resource block. The same process is repeated for each access point in a set until training samples for each resource block of each access point are determined. The overall number of training samples of a WiFi system is CN, where N is the number of APs in the network and C is the number of channels multiplied by the overall sector on/off patterns. During time$_{Ttraining}$, the measurement component 202 works with one assignment for each AP and attains training samples for each AP. In another aspect, in iterative minimization procedure, each AP's system output is measured over a period time$_{TAP}$ for classification and minimization. When going to a next AP, the previous AP's samples can also be added to the training samples.

Classification component is also employed in classifying APs. Classification component 204 is configured to employ wise-optimal hierarchical clustering in order to obtain mean vectors used in classifying the APs. As mentioned infra, each AP can be classified into one or three states normal, bad, and heavily loaded. As used herein, an AP is in a normal state when each performance parameter, noise level, channel utilization, packets error probability, and busy time ratio, is normal. In particular, an AP is in a normal state when noise level is low, channel utilization has a low percentage, packets error probability is low and each AP's averaged busy time ratio is small. In an aspect an AP is in a normal state when noise level is between 0.05 to 5.0 dBm, busy time ratio is between 3% and 20%, packets error probability is between 0.1% and 1.0%, and channel utilization is between 5% and 30%. In another aspect, an AP is in a normal state when noise level is about 0.1 dBm, busy time ratio is about 10%, packets error probability is about 0.5% and Channel utilization is about 10%. In addition, as used herein, an AP is in a bad/interfered state when the AP's noise level is high, channel utilization has a high percentage and packets error probability is high, while the busy time ratio is small. For example, an AP is in a bad/interfered state when noise level is between 5.0 to 20.0 dBm, busy time ratio is between 3% and 20%, packets error probability is about between 10% and 40%, and channel utilization is between 70% and 100%. In another aspect, an AP is in a bad/interfered state when noise level is about 10 dBm, busy time ratio is about 10%, packets error probability is about 30%, and channel utilization is about 90%. Further, as used herein, an AP is in a heavy load state when the AP's channel utilization has a high percentage, packets error probability is high, and busy time ratio is large, while the noise level is low. In an aspect, an AP is in a heavily loaded state when noise level is between 0.05 and 5.0 dBm, busy time ratio is between 70% and 100%, packets error probability is between 10% and 40% and channel utilization is between 70% and 100%. In another aspect, an AP is in a heavily loaded state when noise level is about 0.1 dBm, busy time ratio is about 90%, packets error probability is about 30% and channel utilization is about 90%.

A normal state as embodied in low levels of each of the four parameters indicates that traffic loading is normal and there are no hidden nodes or strong interference from non-WiFi systems. A bad state as embodied in high levels of each of the four parameters except busy time ratio indicates interference, such as that caused by hidden nodes in the WiFi system or non-WiFi system causing the reference packet to be corrupted. As used herein, the term interfered state is used interchangeably with the term bad state. For example, in the absence of heavy loading, if the received signal strength out of the WiFi system (such as Blue Tooth, microwave oven, etc.) is strong enough to cause the packet to be dropped, the phenomenon is referred to as interference. Further, in the absence of heavy loading, interference is also observed if the sum of one or more undeserved APs' arriving packets in the WiFi system can cause the reference packet to be corrupted. A heavy loaded state as embodied in high levels of each of the four parameters except noise level is seen where one AP may be supporting many clients which causes per-client throughput to be low. For example, with respect to traffic loading, if there are clients from some other WiFi systems in the AP's range, there will be an overall network degradation.

The above mentioned traffic loading and interference problems are merely presented as examples of issues affecting the state of an access point. It should be appreciated that a variety of phenomenon's can be anticipated that will effect performance parameters, noise level, channel utilization, packets error probability, and busy time ratio. Regardless of the underlying reason affecting the above performance parameters, as discussed infra, implementation of the subject PLI algorithm results in increasing the distribution of APs having a normal classification thus alleviating system degradation.

As discussed above, the measurement component 202 produces samples, including training samples. Training samples represent averaged parameters for noise level, channel utilization, packets error probability and busy time ratio of each AP over time and each AP's associated clients. Specifically, each AP's state has relation with all other APs' states in a WiFi system. However, the parameters associated with each sample are not labeled by their state. The classification component 204 thus employs and unsupervised (on the other hand, procedures that use labeled parameters are said to be supervised) algorithm called wise-optimal hierarchical clustering in order to determine states related to the parameters for each sample. The output of the wise-optimal hierarchical clustering is a mean normal value, a mean bad value, and a mean heavily loaded value representative of a pool of all parameters collected by the measurement component. As discussed infra, these mean values are needed to classify the APs, for example, when employing iterative topology control, also discussed infra.

The wise optimal hierarchical clustering algorithm employed by the classification will now be described. Consider a sequence of partitions of n samples into c clusters. The first of these is a partition into n clusters, each cluster containing exactly one sample. The next is a partition into n−1 clusters, the next a partition into n−2, and so on until the nth, in which all the samples from one cluster. The most natural representation of hierarchical clustering is a corresponding tree, called a dendrogram, which shows how the samples are grouped.

FIG. 3 shows a dendrogram 300 for a simple problem involving eight samples denoted by $X_1$-$X_8$. K denotes the number of levels which is 8. Level K=1 shows the eight samples as singleton clusters. At level K=2, samples $X_6$ and $X_7$ have been grouped to form a cluster, and they stay together at all subsequent levels. If it is possible to measure the similarity between clusters, then the dendrogram is usually drawn to show the similarity between the clusters that are grouped.

Figure 4:
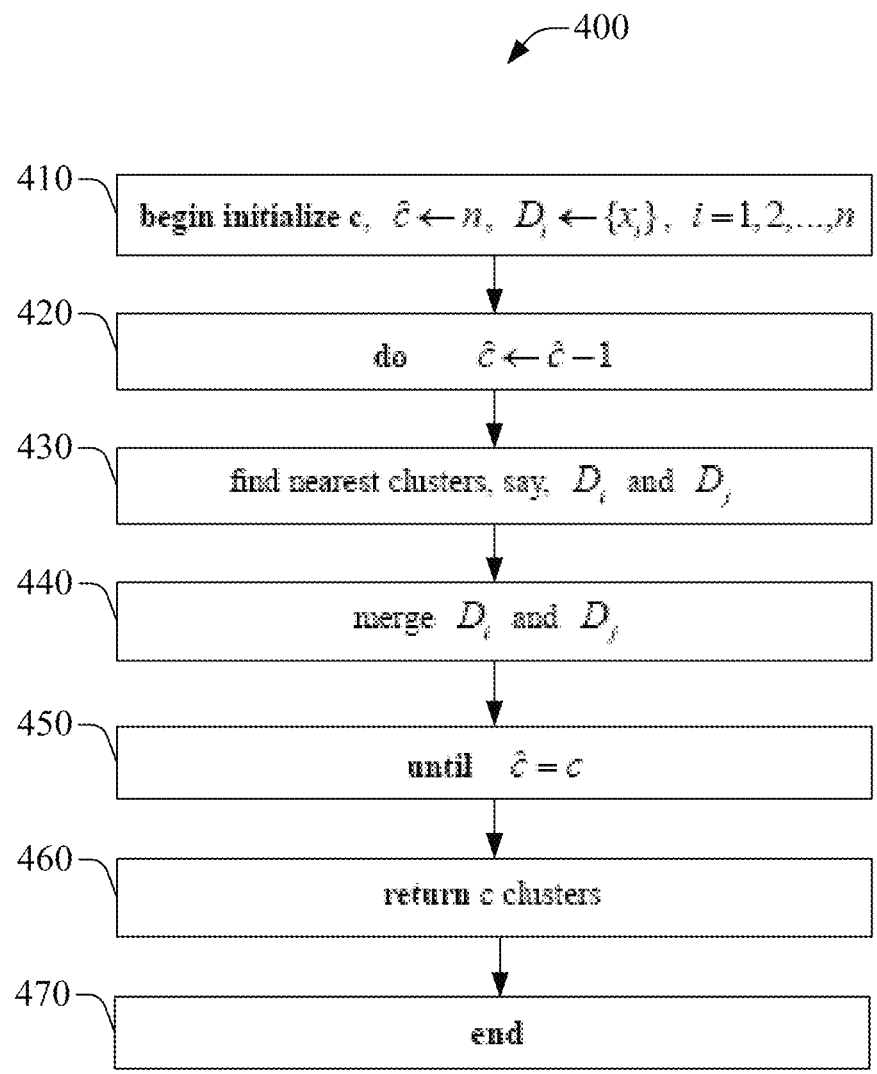
FIG. 4 illustrates a process of stepwise-optimal hierarchical clustering in accordance with an embodiment.

FIG. 4 presents the major s in wise-optimal hierarchical clustering 400. In process 400, c is the desired number of final clusters, and x is a vector representing features of an AP with respect to noise level, channel utilization, packets error probability, and busy time ratio, $D_i$ a cluster of samples where i is an index and ĉ is an initializing number of clusters, and n is the number of samples. 410 begins with initializing c as follows. ĉ←n, $D_i$←{$x_i$}, i=1, 2, . . . , n. At 420, perform ĉ←ĉ−1. At 430, the nearest clusters are found say, $D_i$ and $D_j$. At 440, $D_i$ and $D_j$ are merged. At 450, $D_i$ and $D_j$ are merged until ĉ=c. At 460 c specified clusters are returned. At 470, the process is ended.

As described, above, procedure 400 terminates when the specified number of clusters has been obtained and returns the clusters, described as set of points. If the procedure is continued until c=1, it is possible to produce a dendrogram like that in FIG. 3. When examining a dendrogram representative of samples collected by the measurement component, the distance between two clusters is defined as $$d_e(D_i, D_j) = \sqrt{\frac{n_i n_j}{n_i + n_j}} \|m_i - m_j\| \qquad \text{(Eq 1.1)}$$

where $m_i$ and $m_j$ are mean vectors of the ith and jth clusters, $n_i$ and $n_j$ are sample numbers of the two corresponding clusters.

The sum-of-squared-error criterion function is denoted by $J_e$. By an analysis, the pair of clusters whose merger increases $J_e$ as little as possible is the pair for which the distance $d_e$ ($D_i$, $D_j$) is minimal. Thus, in selecting clusters to be merged, this criterion takes into account the number of samples in each cluster as well as the distance between clusters. In general, the use of $d_e$ ($D_i$, $D_j$) tends to favor growth by merging singletons or small clusters with large clusters over merging medium-sized clusters.

In the end, c clusters are acquired. In an aspect, c=3. Then, the mean vector of each cluster is determined. For example, where c=3 mean vectors $m_1$=[$m_{1,N}$,$m_{1,C}$,$m_{1,P}$,$m_{1,B}$]$m_1$=[$m_{1,N}$,$m_{1,C}$,$m_{1,P}$,$m_{1,B}$],$m_2$=[$m_{2,N}$,$m_{2,C}$,$m_{2,P}$,$m_{2,B}$] and $m_3$=[$m_{3,N}$,$m_{3,C}$,$m_{3,P}$,$m_{3,B}$]. For each mean vector $m_{1,N}$,$m_{1,C}$, $m_{1,P}$,$m_{1,B}$ for example denotes the mean values of noise level, channel utilization, packets error probability and busy time ratio. Each m has four columns: noise level, channel utilization, packets error probability, and busy time. The classification component 204 determines the cluster that has the largest mean noise level as in a bad state, the cluster that has the largest busy time as in a heavily loaded state, and the remaining clusters as in a normal. Therefore, after comparing the four values of each cluster, the classification component 204 can label each cluster as having a bad state, a heavy state, or a normal state.

Figure 5:
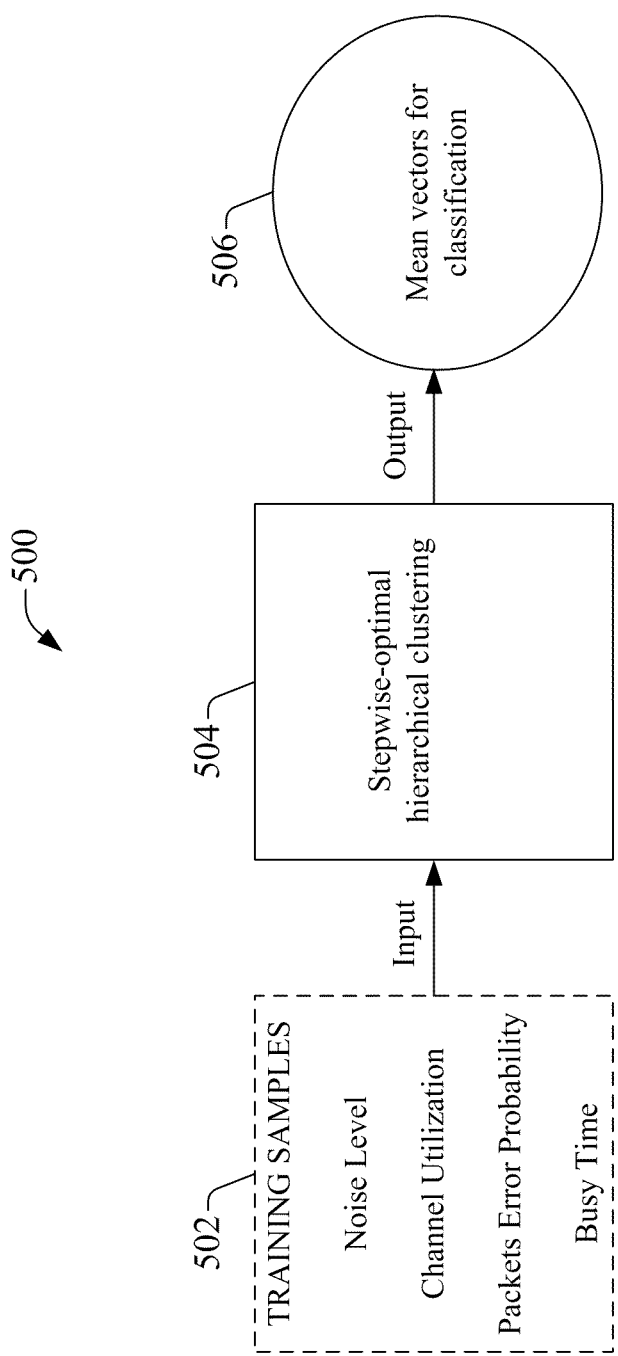
FIG. 5 presents a process of obtaining mean vectors via employing an unsupervised step-wise optimal hierarchical clustering algorithm, in accordance with an embodiment.

FIG. 5 presents a process 500 of the classification component 204 employing unsupervised wise-optimal hierarchical clustering in order to obtain mean vectors for classification. The input parameters are training samples. As indicated supra, a sample includes measurement parameters for each AP in a set under each a given resource block. A single AP can have several samples associated with it depending on the number of resource block for the AP. Collectively, samples are gathered from each AP in a set under different resource blocks. Each time samples are gather for all APs under set resource blocks, the samples are pooled together to establish training samples. In an aspect, samples are measured for one AP in a set of APs under a resource block associated with the one AP while all other APs keep their resource bocks fixed. Once all samples are collected for the one AP, the process is performed at another AP and so on until a complete set of samples from all AP under all resource blocks associated with each AP, is determined. This process can be performed prior to classifying any APs in order to get a complete set of training samples to be utilized in the wise hierarchical clustering. Looking now at process 500, at 502, training samples are input into a wise-optimal hierarchical clustering procedure 504. The output 506 is the mean vectors $m_N$, $m_B$, and $m_H$, where $m_N$ is the mean value of the normal state, $m_B$ is the mean value of the bad state, and $m_H$ is the mean value of the heavily loaded state.

In addition to performing wise-optimal hierarchical clustering to obtain mean vectors, the classification component 206 further employs the mean vectors in order to classify each access point as normal, bad, or heavily loaded. Herein, the classification procedure is describe with respect to a WiFi infrastructure network where the access points (APs) are equipped with antennas of c sectors, while the clients have only one omni-directional antennas.

The purpose of classifying APs as normal, bad, or heavily loaded is to eventually minimize the aggregate interference (bad) and heavily loaded APs and acquire a greater distribution of normal APs. Later, a topology control protocol is presented which aims to achieve the above purpose. Normal APs increases the overall system throughput because in that state, the noise level is low, channel utilization is correspondingly normal, packets error probability is small and busy time ratio is in the lowest percentage as possible in the network. The topology control protocol discussed infra results finds the resource block (channel and sector on/off pattern) allocation of APs which achieves that aim. First the number of APs in the WiFi system in normal state, in BAD state and in heavily loaded state is defined as $N_n$, $N_B$ and $N_H$ respectively. Each AP will have a sample. The distance between an AP and the normal state, bad state or heavily loaded state is $$d_N = \|x - m_N\| \tag{1.2}$$

where $m_N$ is the mean value of normal state, it can also be $m_B$ (mean value of bad state) or $m_H$ (mean value of heavily loaded state) and x is the sample vector of AP. The APs are classified as normal, bad, or heavily loaded based on the minimal distance in $d_N$, $d_B$ and $d_H$ respectively.

Figure 6:
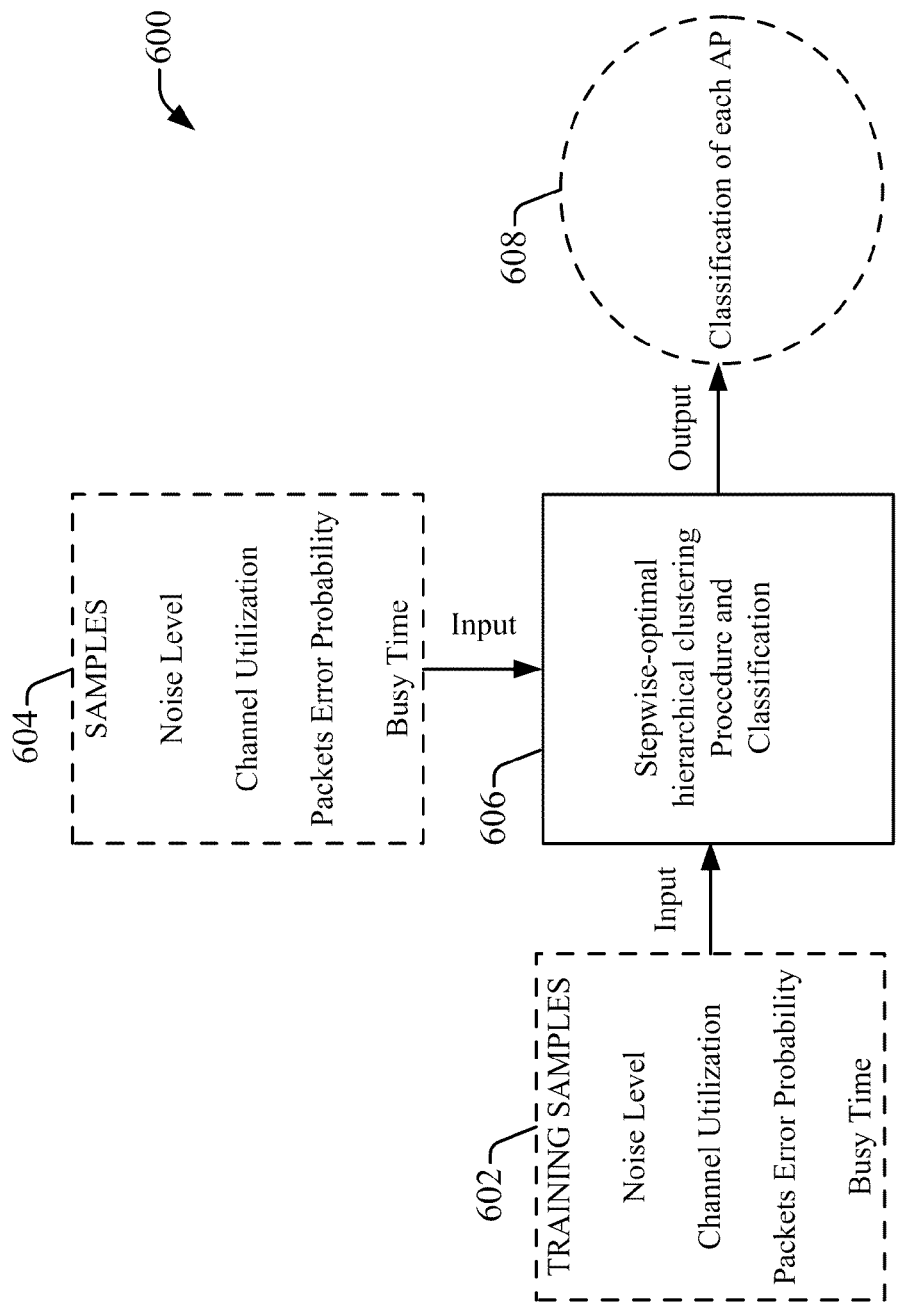
FIG. 6 presents a flow diagram of classification of access points (APs) in accordance with an embodiment.

FIG. 6 presents a process 600 of classifying access points in accordance with an embodiment. At 602, training samples are input. At 606, samples of APs are input. As discussed supra, training samples and samples consist of the same type of content. The content in the training samples and the samples is measurement parameters, (noise level, channel utilization, packets error probability, and busy time) for each access point in a set of access points under resources blocks associated with each access point. The number of samples depends on the number of access points and more particularly, the number of resource blocks under to which samples are measured. Training samples generally contains a collected pool of samples over time. As discussed supra, a complete set of training samples can be gathered prior to classification, and/or running of the topology control algorithm discussed infra. In general, sample which are input at 604 include a sample from each access point in the set under a single resource block for each access point at a later point in time than collection of the training samples. The samples and the training samples are combined at 606 and wise-optimal hierarchical clustering is performed in order to obtain the mean values $m_N$, $m_B$ and $m_H$. The mean values are then employed in classification according to equation 1.2. At 608, the classification of the access points is determined and output.

Turning back to FIG. 2, the interference adaptation platform 200 further includes an optimization component 206. The optimization component 206 is configured to employ an iterative topology control protocol in order to minimize the aggregate interference and heavily loaded APs and acquire as many normal APs as possible in the network. In other words, the optimization component is configured to increase the percentage of APs having a normal classification in a network. The optimization component thus determines the resource block (channel and sector on/off pattern) allocation of APs which achieves that aim. The goal of the optimization component which aims to minimize the aggregate interference and heavily loaded APs and acquire a higher percentage of normal APs is defined as follows:

$$\text{minimize } (N_B + N_H - N_n) \tag{1.3}$$

where $(N_B + N_H - N_n)$ denotes the output of the system.

The optimization problem is formally defined as follows. Let $X_{u,i}$ be a decision variable that denotes whether or not antenna pattern i is assigned to AP u. $X_{u,i}=1$ if antenna pattern i is assigned to node u and $X_{u,i}=0$ otherwise. Let $Y_{u,j}$ be a decision variable that denotes whether or not channel j is assigned to AP u. $Y_{u,j}=1$ if channel j is assigned to node u and $Y_{u,j}=0$ otherwise. The topology control problem is defined as follows:

$$\begin{aligned}\underset{X_{u,i}, Y_{u,j}}{\text{minimize}} & \; (N_B + N_H - N_n) \\ \text{s.t.} & \; X_{u,i} \in \{0, 1\}, \forall u \in U, \forall i \in K \\ & \; Y_{u,j} \in \{0, 1\}, \forall u \in U, \forall j \in C\end{aligned} \tag{Eq 1.4}$$

The optimization component 206 employs an iterative topology control protocol that aims to solve the topology control optimization problem 1.4. The protocol works transparently with existing link selection mechanisms and can be implemented on top of the 802.11 MAC protocol using commodity 802.11 wireless hardware. The protocol uses as input the active links E' from the link selection mechanism and the values from the measurement protocol. The control protocol is employed to iteratively minimize the objective function (1.4) in the meanwhile other APs keep their channel and on/off pattern unchanged. Selection of the APs' order is arbitrary.

Figure 7:
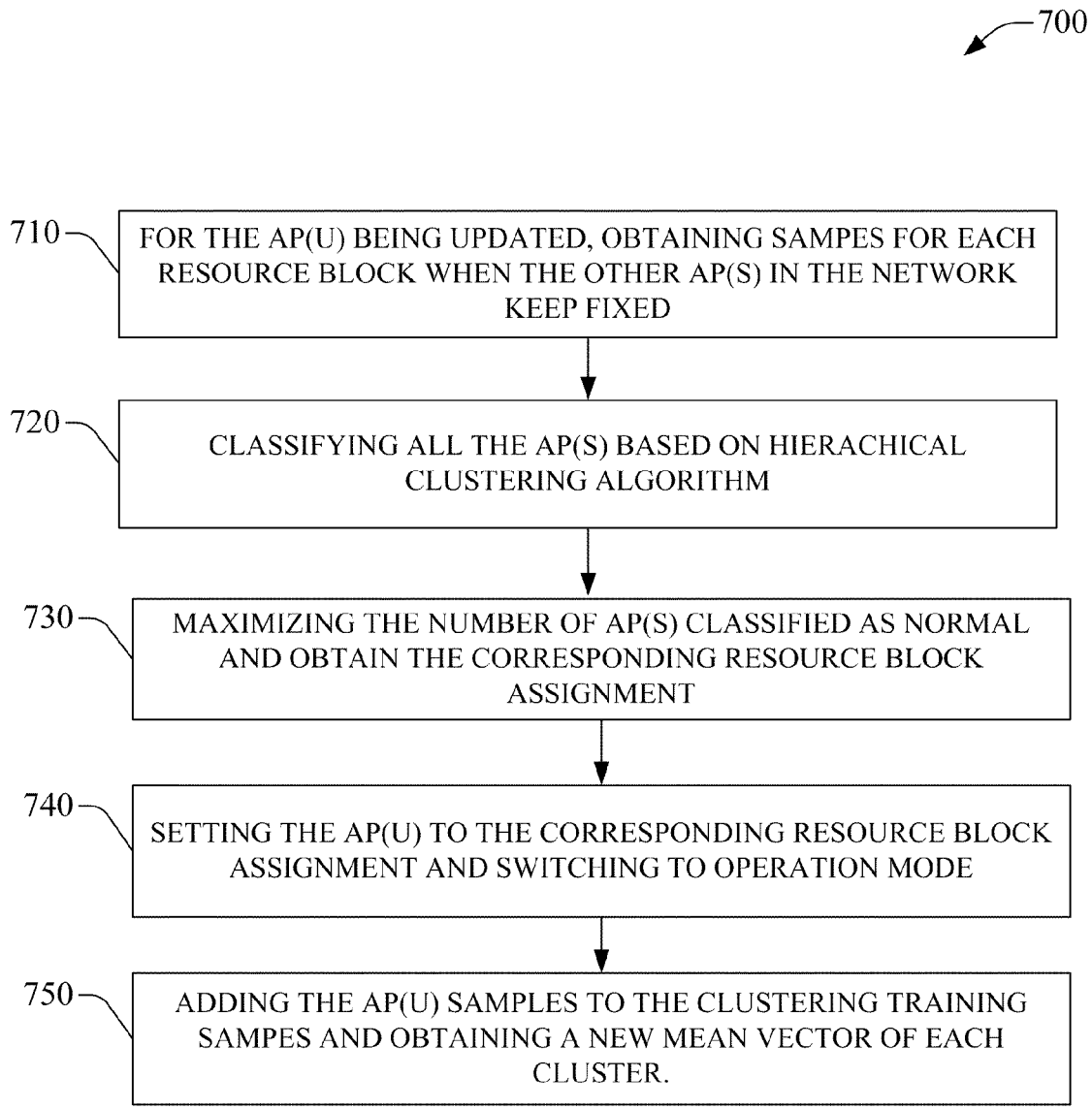
FIG. 7 illustrates an iteration process of an iterative topology control algorithm in accordance with an embodiment.

FIG. 7 presents a block diagram of an iterative topology protocol process 700 in accordance with an aspect of the subject disclosure. The process in FIG. 6 presents a single iteration with respect to AP u. With respect to process 700 when an AP u (or w) becomes BUSY (actually it is training mode), it performs the following actions: it switches to BUSY state, all other APs keep their channel and sectors on/off patterns unchanged, AP u changes its channel and sectors on/off pattern and acquires the corresponding feature vectors, then sets a timeout equal to BUSY TIMEOUT which is the maximum duration APs participate in each attempt. In particular, at 710, AP u first becomes BUSY, and acquires performance parameters as follows: the AP u being updated shall obtain the feature vector for each resource block (channel and on/off antenna pattern) while the rest of the AP keeps fixed. At 720, the APs are classified based on the hierarchical clustering algorithm. At 730, the AP then maximizes the number of APs classified as normal and minimizes the number of AP classified as bad and heavily loaded and obtains the corresponding resource block/assignment $x_u^*$ and $y_u^*$. Then, at 740, the AP switches to FREE state (operation mode) and switches to the new antenna pattern assignment $x_u^*$ and channel $y_u^*$. At 750, according to classification, AP's samples are added to the clustering training samples, and a new mean vector of each clustering is obtained.

What has been described above are various aspect of the PLI algorithm as performed by component of interference adaptation platform 200, including measurement component 202, classification component 204, and optimization component 206.

Figure 8:
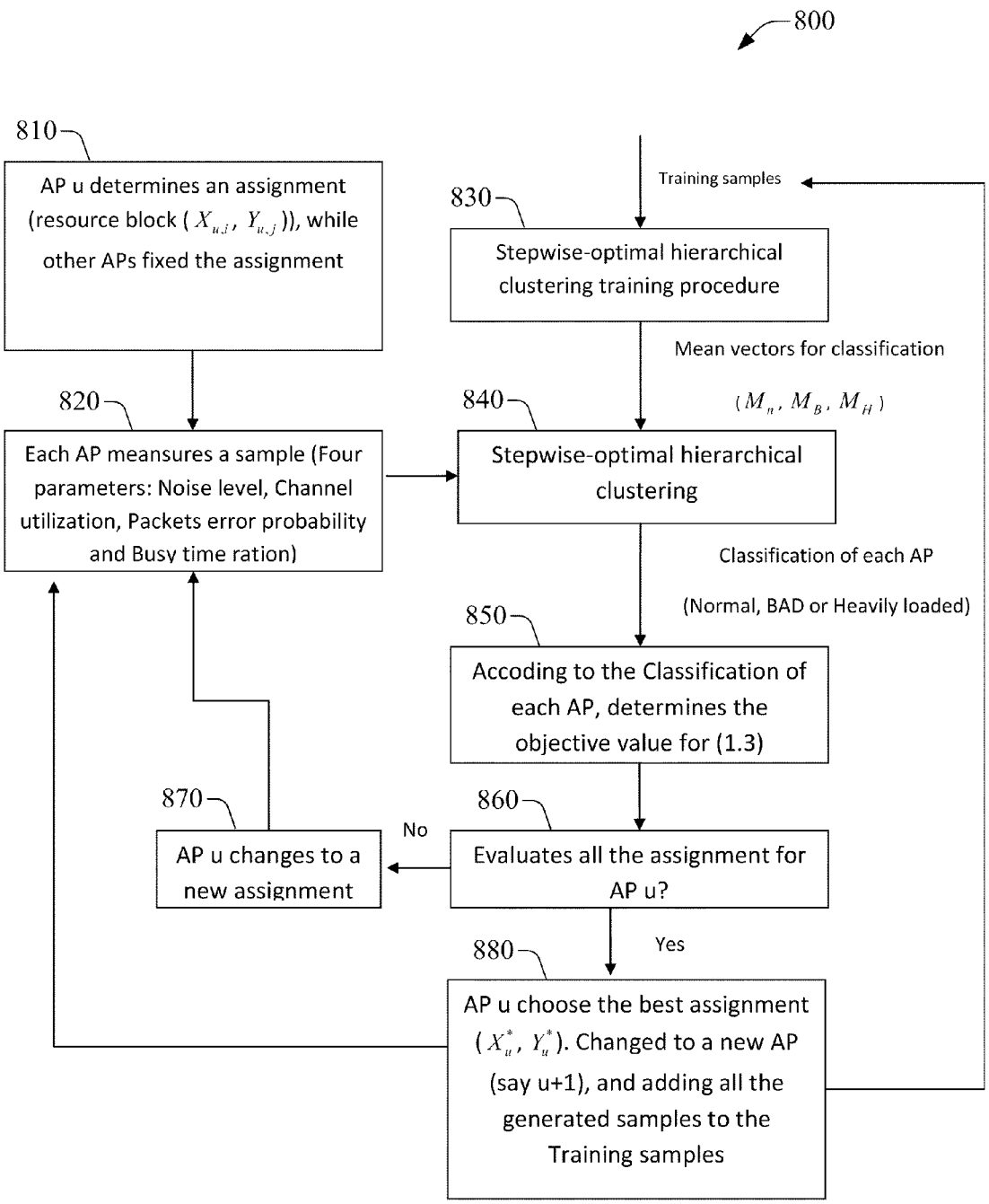
FIG. 8 illustrates a flow diagram of a physical layer interference (PLI) algorithm in accordance with an embodiment.

FIG. 8 presents a flow chart of the entire process of the PLI algorithm according to an aspect of the disclosure. The PLI algorithm operates on a macroscopic time scale by updating multiple APs of a WiFi system over a period of time until the PLI algorithm reaches convergence. Convergence is reached when additional changes to resource block assignments of the APs no longer affect the objective of equation 1.3. As noted supra, this objective is to determine the resource block (channel and sector on/off pattern) allocation of APs which minimizes the aggregate interference and heavily loaded APs and acquire as more normal APs. In an aspect the PLI algorithm is guaranteed to converge to a local minimum, after a finite number of iterations, regardless of initial state because after each iteration the objective function decreases and there is a finite number of antenna pattern combinations in the network. In overview, each AP shall monitor and keep track of its state on each resource block (antenna pattern and frequency channel) and dynamically assign the most suitable resource block at each AP based on the instantaneous states. In an aspect, the optimization component 206 executes the PLI algorithm once every hour, once every couple hours, once every few hours, and so on. In another aspect, the PLI algorithm is executed once every day. As can be observed in the running of the algorithm described with respect to FIG. 8, the PLI algorithm adopts stochastic learning approach and no prior knowledge of interference statistics and source statistics is needed. Accordingly, the PLI algorithm is robust to uncertainty in modeling.

Looking at FIG. 8, according to an aspect, before the PLI algorithm is run through completion to obtain resource blocks for each AP that maximizes distribution of normal APs in the system, at 830 training samples are obtained and a wise-optimal hierarchical clustering training procedure is performed to obtain mean vectors mean values $m_N$, $m_B$ and $m_H$. In another aspect, 830 is repeated each time the pool of training samples increases, for example each time samples are added during the running of the algorithm, in order to obtain new mean values $m_N$, $m_B$ and $m_H$ for classification. Process 800 is described for exemplary purposes wherein at 830 training samples are first obtained and a wise-optimal hierarchical clustering training procedure is performed to obtain mean vectors mean values $m_N$, $m_B$ and $m_H$ is thus performed for the first time before 810 and 820. However, each time the algorithm is run in a subsequent iteration, (i.e, s 820-880 are repeated), 830 is repeated.

Turning now to 810, at 810, AP u (the selection of APs in a set is arbitrary) determines an assignment $(X_{u,i}, Y_{u,j})$ while all other APs in the network (in the set selected by the operator) keep their assignments fixed. At 820, each AP in the network, including the AP u, then measures a sample which represents four parameters: noise level, channel utilization, packets error probability, and busy time ratio. In the meantime, training sample have already been collected at 830 and wise-optimal hierarchical clustering has been performed to obtain mean vectors $m_N$, $m_B$ and $m_H$ for classification. At 840, wise-optimal hierarchical clustering can be employed to facilitate classification of each of the APs, where the input values are the samples from each AP collected at 820 and the mean vectors determined at 830. The output of 840 is the classification of each AP in the network as normal, bad, or heavily loaded. At 850, according to the classifications of each of the APs, an objective value of equation 1.3 is determined. In an aspect, the objective value is stored in memory and associated with the configuration of resource block associated with the APs when samples where measured at 820, 860 indicates that s 820-860 should be repeated until each assignment for APu is evaluated. Assuming that only one assignment for AP u has been evaluated, AP u changes to a new assignment and s 820-860 are repeated until all of the assignments for AP u have been evaluated. Then at 880 AP u chooses the best assignment $(X_u^*, Y_u^*)$, that produces the best objective value of equation 1.3. All samples generated are added to the training samples, and a new AP in the network is selected (arbitrarily say u+1), and the entire process 800 is repeated for the new AP.

Figure 9:
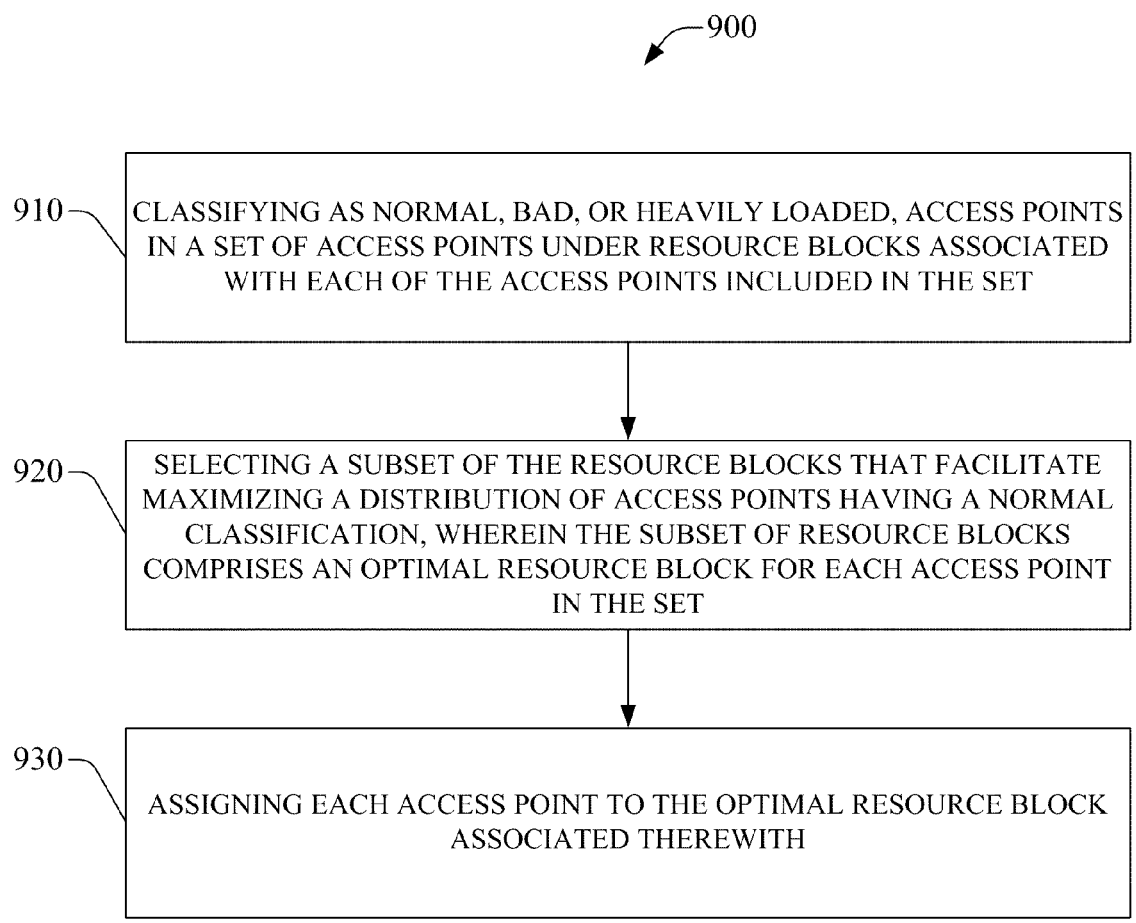
FIG. 9 illustrates a process of a PLI algorithm in accordance with an embodiment.
Figure 10:
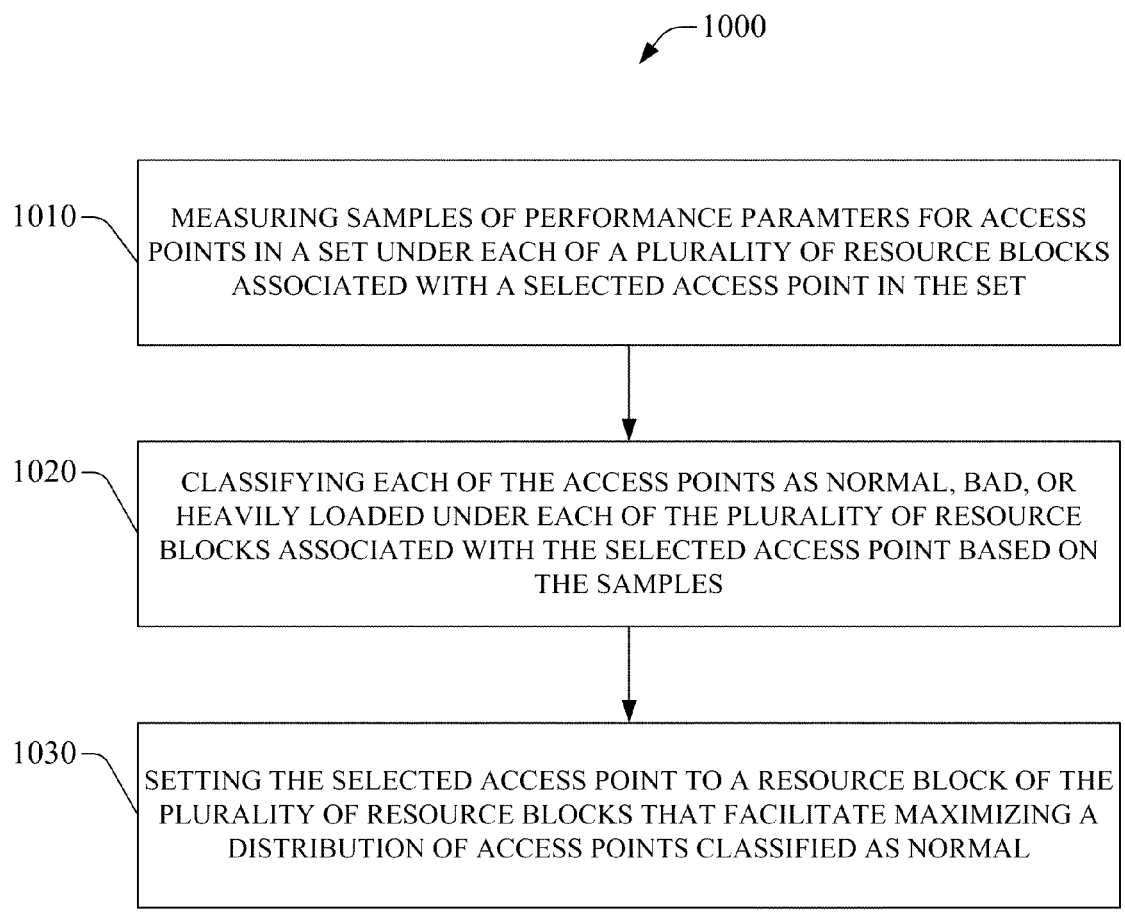
FIG. 10 illustrates another process of a PLI algorithm in accordance with an embodiment.

FIGS. 9 and 10 (as well as FIG. 4 and FIG. 7 presented supra) illustrate methodologies in accordance with the disclosed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 9, a process 900 for optimizing WiFi network throughput is presented in accordance with an embodiment. At 910, access points in a set of access points are classified as normal, bad, or heavily loaded, under resource blocks associated with each of the access points included in the set. At 920, a subset of the resource blocks that facilitate increasing the number of access points having a normal classification is selected, wherein the subset of the resource blocks comprises an optimal resource block for each access point in the set. At 930, each access point is assigned to the optimal resource block associated therewith.

Referring to FIG. 10, another process 1000 is presented in accordance with an embodiment. At 1010, samples of performance parameters for access points in a set are measured under each of a plurality of resource blocks associated with a selected access point in the set. At 1020, each of the access points are classified as normal, bad, or heavily loaded under each of the plurality of resource blocks associated with the selected access point based on the samples. Then, at 1030, the selected access point is set to a resource block of the plurality of resource blocks that facilitate increasing the number of access points classified as normal.

The PLI algorithm described herein has proved to be an effective tool for increasing throughput of a WiFi system. Performance of the proposed algorithm was evaluated through an extensive simulation study with the network simulator ns-2.29. All simulations wer done using the simple path loss model of ns-2.29 without shadowing. Some modules were implemented, such as directional antenna and multi-channels from TENS (the enhanced network simulator) and infrastructure mode, into ns-2.29 to make the simulation results more realistic and fitting to the PLI algorithm. In the simulation, each AP was equipped with a multi-sector (four) antenna similar to the Altai B8 Access Point. Each of the four sectors covered a different quarter of the azimuth plane. The sectors at each AP could be simultaneously activated in any combination, thus allowing 16 different antenna patterns. Sectors-all-on pattern was achieved by simultaneously activating all four sectors. All the APs and clients could use one of the three non-overlapping channels in an ISM 2.4 GHz spectrum. Further, CSMA/CA mode in ns-2.29 was enabled.

In the simulation there were three APs (similar to the number of the Altai B8 Access Points) and four clients in the system. The APs formed a triangle. The clients were distributed according to a spatial Poisson point process. The APs were sending downlink traffic to clients through a UDP agent and there was an EXPOO traffic agent for each AP. An EXPOO traffic generator was used to generate packets and then collect measurement data. The parameters of EXPOO traffic were a packet size 200-bytes, burst time 2 s, idle time 1 s and date rate 300 kb/s. The queue mode was 100 ms drop tail. In the testbed some client nodes were deployed as hidden nodes and some client nodes were deployed that caused the concerned AP to be heavily loaded.

The baseline of the simulation was an "open loop" system, where the antenna pattern and the channel allocation at each AP was static (rather than dynamic). In other words, the entire WiFi network was not able to detect normal, bad, and heavily loaded states on the fly. The proposed scheme tested was the protocol of the PLI algorithm discussed in accordance with the subject disclosure. As an overview, the AP monitored and kept track of its state on each resource block (antenna pattern and frequency channel) associated therewith and dynamically assigned the most suitable resource block at each AP based on the instantaneous states.

With respect to the results, the system throughput in the above WiFi infrastructure was captured at an interval of 0.5 seconds. A classification (normal state, bad state and heavily loaded state) of the APs both in the baseline and in the proposed scheme were captured through the method of stepwise-optimal hierarchical clustering. The states of the APs were induced by the traffic and interference dynamics in the client—AP—path loss—fading dynamics and they were random.

In a first scenario, the open-loop baseline scheme ended up having two APs in NORMAL STATE and one AP in BAD STATE. In a second scenario, the open loop baseline ended up having two APs in NORMAL STATE and one AP in HEAVILY LOADED STATE. In third scenario, the baseline open-loop scheme ended up having one AP in NORMAL, one in BAD, and one in HEAVILY LOADED states. However, using the proposed scheme, all the 3 APs can operated in the NORMAL STATE despite the random disturbance from the hidden node clients. Significant average system throughput gain in the three scenarios was obtained. In particular, in the first scenario an average system throughput gain of 1.405 Mb/s was obtained. In the second scenario an average system throughput gain of 1.295 Mb/s was obtained, and in the third scenario, an average system throughput gain of 1.843 Mb/s was obtained.

Section II—MACLE

What has been described above are systems and methods that address increasing the throughput of WiFi systems at the physical layer. In particular, the above systems and methods reduce interference by dynamically controlling channel selection and antenna sector patterns for each access point in a set of access points. The above methods employ a physical layer interference (PLI) algorithm that operates on macroscopic time scale by implementing measurement, analysis, and control of the physical layer of a WiFi to optimize interference aspects of the WiFi system. However, given the complex nature of WiFi systems, addressing interference at the physical layer merely deals with a portion of the WiFi system architecture to optimize the total health and efficiency of the system. Presented below are systems and methods for enhancing throughput of a WiFi system by addressing parameters affecting efficiency at the media access control (MAC) level.

Figure 11:
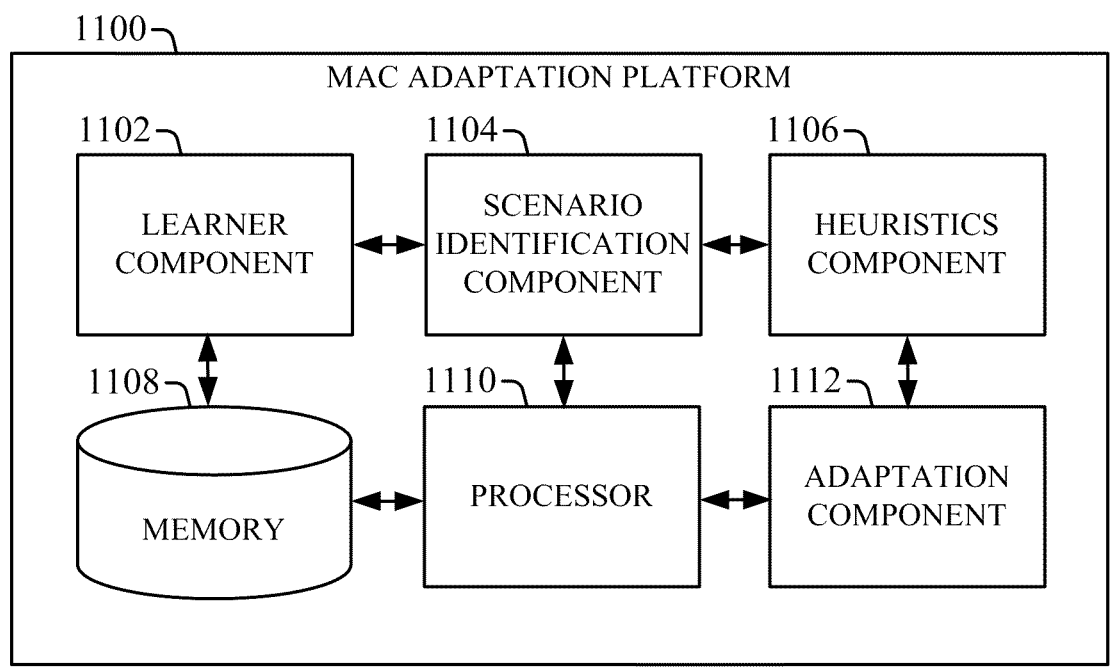
FIG. 11 presents a block diagram of a MAC adaptation platform in accordance with an embodiment.

FIG. 11 presents a block diagram of a media access platform 1100 in accordance with aspects of the disclosure. Media access platform 1100 employs a novel control algorithm, herein referred to as the MAC layer efficiency (MACLE) algorithm, a to jointly adjust the transmit power, transmit data rate as well as carrier sensing thresholds based on the instantaneous throughput and scenario identification at a microscopic time scale (per-packet level). As discussed supra, the media access platform utilizes the theory of "multi-agent learning" for scenario identification. Similar to the PLI algorithm, the MACLE algorithm adopts stochastic learning approach and no prior knowledge of interference statistics and source statistics is needed. Accordingly, the MACLE algorithm is robust to uncertainty in modeling. However, while the PLI algorithm facilitates centralized control (it can be executed at a network controller), the MACLE algorithm facilitates decentralized control as it is performed at each network node on a packet level. The media access platform 1100 can be applied to IEEE 802.11n and future 802.11 VHT next-generation gigabit WiFi systems to boost application throughput. For example, media access platform 1100 can be employed to boost throughput in wireless home multimedia networking and wireless gaming. Media access platform 1100 operates in a fully distributive manner, which is scalable and robust to any ad hoc network topologies.

In an aspect, media access platform 1100 can be employed in a WiFi network comprising a set of APs and a set of clients or nodes. For example the WiFi system 100 depicted in FIG. 1 can serve as an exemplary model. It should be appreciated that a variety of network configurations including the number of APs and associated nodes can be employed in accordance with aspects of the subject disclosure. Further, the number and degree of external system components, such as other system nodes, affecting the WiFi system optimized by media access platform can further vary.

As noted above, media access platform 1100 works to adjust four parameters including, transmit rate (Tx rate), transmit power (Tx power), carrier sensing threshold (Tcs) and MIMO transmit mode (Tx mode) associated with WiFi nodes. Prior to presenting the components of media access platform 11000 that facilitate operation of the algorithm, the set of possible we knob configurations for the algorithm with respect to the four parameters is presented. The set of knob configurations can be selected at design time by the operator. As exemplified below, the state space is restricted to allow faster convergence of the algorithm. Increasing the number of possible configurations decreases convergence speed, but possibly allows more optimal results.

The set of knob configurations for Tx rate merely the rates the media access platform 1100 supports. Due to the underlying modulation schemes, the Tx rate is the least flexible parameter and hence does not need any design-time restriction. Therefore, as described herein, network nodes can use all the rates the media access platform 1100 supports and use these rates to bound Tcs and Tx power. The number of available rates is $n_R$.

With respect to the knob configurations for Tx power, as used herein, the number of transmission powers is set equal to the number of rates and distributed uniformly over the interval $$\left[\frac{\max(P_t)}{n_R}, \max(P_t)\right].$$

Further, with respect to the knob configurations for carrier sense threshold (Tcs) the transmitting node can select its Tcs based on the path loss:

$$T_{cs}[i] = \left(\frac{P_r}{P_t}\right)^k \left(\frac{P_r}{\text{SINR}[i]} - \sigma^2\right),$$

where $P_t$ is the transmit power,
$P_r$ is the received power,
$\sigma^2$ is a model for the noise power at the receiver, and SINR[i] is the signal-to-interference-noise threshold for rate R[i].

Each node has multiple transmit and receive antennas, so $P_t$ and R[i] are the summation of all antennas in one transmitter. The operator can choose the parameter k from the interval [−1, 1]. The aggressive point, k=−1, assumes that the interference power suffers from the same path loss as the link between transmitter and receiver. The defensive point, k=1, assumes that the interference power, when measured at the transmitter, suffers an extra path loss from receiver to transmitter. Throughout the remainder of this disclosure, a neutral setting (k=0) is employed. This implies that the transmitter needs to know the value of $P_r$. One way to determine the value of $P_r$ is to piggyback the received power estimated at the receiver in the acknowledgment. This has already been integrated in current 802.11 commercial products. Lastly, knob configurations for Tx mode can be separated from the above three parameters, and is discussed infra with respect to adaptation component 1112.

As seen in FIG. 11, media access platform 1100 comprises a learner component 1102, a scenario identification component 1104, a heuristics component 1106, and an adaptation component 1112. Learner component 1102, scenario identification component 1104, heuristics component 1106, and adaptation component 1112 are each configured to carry out various operations of the MACLE algorithm. Media access platform further comprises a memory 1108 and a processor. Although memory 1108 and processor 1110 are depicted as internal to media access platform 1100, it should be appreciated that memory and processor 1110 can be externally located components. The processor 1110 facilitates controlling and processing all onboard operations and functions of the media access platform 1100. Memory 1108 interfaces to the processor 1110 for storage of data and one or more applications of media access platform 1100. The applications, MACLE algorithm, and associated component instructions for carrying out the MACLE algorithm, can be stored in the memory 1108 and/or in a firmware, and executed by the processor 1110 from either or both the memory 1108 or/and the firmware (not shown). The firmware (not shown) can also store startup code for execution in initializing the handset sensing device.

The media access platform 1100 is configured to carry out the MACLE algorithm. As noted above, each of the components of the media access platform 1100 are configured to carry out various operations of the MACLE algorithm. In general, the learner component 1102 interprets how a network environment reacts to the selected actions and adapts its actions based on this feedback. The learner component 1102 is assisted by heuristics determined by the heuristics component 1106 to speed up convergence. The heuristics component 1106 suggests actions that are based on scenario identification taken from local observations of the network environment.

The learner component 1102 is configured to find the optimal configuration of node parameters transmit rate (Tx rate), transmit power (Tx power), carrier sensing threshold (Tcs) and MIMO transmit mode (Tx mode), in the state space. The learner component 1102 employs a learning based approach rather than relying only on a heuristic approach. In an aspect, the learner component employs Q-learning in order to determine adaptation actions with respect Tx rate, Tx power, Tcs. (As noted infra, the learner component 1102 can employ a separate process for determining Tx mode adaptation actions). Q-learning is a reinforcement learning technique that works by learning an action-value function that gives the expected utility of taking a given action in a given state and following a fixed policy thereafter. One of the strengths of Q-learning is that it is able to compare the expected utility of the available actions without requiring a model of the environment. Q-learning is also advantageous in that it can be employed online.

The Q-learning algorithm continuously estimates the values of state-action pairs. As used herein, an action is the transition from a current state ($s_c$) to a new state ($s_n$). A nodes state involves the values or levels of node parameters Tx rate, Tx power, Tcs, and Tx mode. Accordingly, an action is an adaptation is an adaptation of a single node parameter. The value $Q(s_c, s_n)$ is defined as the expected discounted sum of future payoffs obtained by going to the new state and following an optimal policy thereafter. Once these values have been learned, the optimal action from any state is the one with the highest Q-value. Thus the learner component 1102 can identify the highest Q-value for actions with respect to each of Tx rate, Tx power, Tcs, and Tx mode which increase throughput.

The standard procedure for Q-learning is as follows. All Q-values are initialized to 0. During the exploration of the state space, the Q-values are updated as follows:

$$Q(s_c, s_n) \leftarrow (1-\alpha)Q(s_c, s_n) + \alpha\left[(1-\gamma)r + \gamma \max_{s \in A(s_n)} Q(s_c, s)\right] \quad \text{(Eq 2.1)}$$

The value of $Q(s_c, s_n)$ is defined as the expected discounted sum of future payoffs obtained by going to new state and s is the node state (depends on rate, Tx power and Tcs).

α is the forget factor and γ is the learning parameter.

From a throughput point of view, the best response is to always send packets at the maximum power. Hence, the nodes are given a small incentive to scale down the power. In order to provide incentive to scale down the power, a cost factor is applied for using higher powers. The reward r is defined as the throughput increase for going to another state as follows:

$$r = \bar{\rho}(i_n)S(s_n) - \bar{\rho}(i_c)S(s_c) \quad (2.2)$$

where S is throughput and $\rho(i) = \rho^i$ is the incentive given to a node to scale down the power, i is the power index.

The Q-learning algorithm updates the estimate for each action, but in fact does not specify what actions should be taken. It allows arbitrary experimentation while at the same time preserving the current best estimate of the states' values. In an aspect, in order to specify what actions should be taken, the learner component 1102 simulated annealing. The nodes can explore actions using a soft-max policy, where each terminal selects an action with a probability given by the Boltzmann distribution:

$$p_Q(s_c, s_n) = \frac{e^{\frac{Q(s_c, s_n)}{T}}}{\sum_{\forall s \in A(s_c)} e^{\frac{Q(s_c, s)}{T}}} \quad \text{(Eq 2.3)}$$

where T is the temperature that controls the amount of exploration. For higher values of T the actions are equiprobable. By annealing the algorithm (cooling it down) the policy becomes more and more greedy. In an aspect, the annealing scheme, where θ denotes the annealing factor, is as follows: $T_{k+1} \leftarrow \theta T_k$. After performing the above simulated annealing, the actions for any one or more of the parameters Tx rate, Tx power, Tcs, and Tx mode.

In an aspect, MIMO mode adaptation is determined by the learner component 1102 separately from Tx rate, Tx power, Tcs, through a sequence of algorithms. First, the learner component 1102 assumes perfect channel state information at transmitter (CSIT). With perfect CSIT, capacity can be achieved even for slow fading channels. The MIMO channels can be decomposed into m*=min[$n_T$, $n_R$] decoupled parallel channels, where $n_T$ is the number of transmit antennas and $n_R$ is the number of receive antennas. Hence, the adaptation design problem of the MIMO transmitter can be transformed into the problem for m* parallel channels as follows. The received signal y of the original MIMO channels can be expressed as y=hx+z. If the channel matrix h is i.i.d., it will have full rank with probability 1. Applying SVD on h, we have h=UΛV*, where U and V are $n_R \times n_R$ and $n_T \times n_T$ eigenvector matrices of hh* and h*h, respectively, and Λ is the $n_R \times n_T$ diagonal matrix with the diagonal entries given by the eigenvalues of h. Since U and V are nonsingular, there is no loss of information if we pre-multiply y with U*, as follows $$\tilde{y} = U^* y = \Lambda \tilde{x} + \tilde{z} \quad (2.4)$$

where $\tilde{x}=V^*x$ is the $n_T \times 1$ equivalent channel input vector and $\tilde{z}=U^*z$ is the transformed noise having the same distribution as the original noise.

The MIMO mode adaptation parameters include the encoding rates $r_c=(r_c(1), \ldots, r_c(n_T))$ (coded bits per channel use), the modulation levels $M=(M_1, \ldots, M_{n_T})$, and the power allocation $p=(p_1, \ldots, p_{n_T})$. The total information rate $$R = \sum_n r_c(n) \log_2(M(n))$$

and total power $$P_T = \sum_n p_n$$

equal to the rate R and transmit power $P_T$. In an aspect, a total of only Q combinations of the encoding rate and modulation level per spatial channel is employed. With Q transmission modes per spatial channel, a total of $n_T \log_2(Q)$ overhead control bits in the frame is required to indicate the transmission modes in the packet. The qth transmission mode A(q) is a collective description of the encoding rate vector $r_c(q)$ and the modulation constellation M(q).

Since the original channel matrix h is transformed to the space of $n_T$ eigenvalues $\Lambda=\{l_1, \ldots, l_{n_T}\}$, a general adaptation architecture of the MIMO transmitter can be specified by the CSIT partition {H(1), H(2), . . . , H(Q)}, where the union of the partition regions results in the entire CSIT space and the partition regions becoming mutually disjointed. Given a CSIT Λ, transmission mode A(q) is selected if Λ∈H(q). The learner component is configured to select the transmission modes {A(1), . . . , A(Q)} and CSIT partition {H(1), . . . , H(Q)} so as to maximize the overall throughput of the MIMO link. This can be cast into the following optimization problem.

Assuming that capacity-achieving codes and Gaussian constellations are used in each subchannel, the information rate of the nth subchannel at a transmission mode $A_n(q)$ is given by $R_n(q)=r_c(q,n) \log_2(M(q,n))$. The overall throughput of the MIMO link is given by $$\bar{C} = \sum_{q=1}^{Q} \varepsilon_\Lambda \left[ \max_{(p_1, \ldots, p_{n_T})} \sum_{n=1}^{n_T} R_n(q) 1(C(p_n, \lambda_n) > \right. \quad (Eq\ 2.5)$$

$$\left. R_n(q)) | \lambda_n \in H(q) \right] Pr[\lambda_n \in H(q)]$$

$$= \sum_{q=1}^{Q} \sum_{n=1}^{n_T} R_n(q) \varepsilon_{\lambda_n} \left[ \max_{(p_1, \ldots, p_{n_T})} 1(C(p_n, \lambda_n) > \right.$$

$$\left. R_n(q)) | \lambda_n \in H_n(q) \right] \alpha(q, n)$$

where $$C(p_n, \lambda_n) = \log_2\left(1 + \frac{p_n |\lambda_n|^2}{\sigma_z^2}\right),$$

$$\alpha(q, n) = Pr[\lambda_n \in H(q)]$$

and the $n_T$-dimensional partition region H(q) can be decoupled into $n_T$ one dimensional partition region $H_n(q)$ for n=1, . . . , $n_T$. Transmit power constraint is $e[\Sigma_n p_n] \le P_T$. The inner optimization solution with respect to the power allocation $p_1, \ldots, p_{n_T}$) is given by the standard power water-filling solution $$p_n^* = \left(\frac{1}{\mu} - \frac{\sigma_z^2}{|\lambda_n|^2}\right)^+ \quad (Eq\ 2.6)$$

where $x^+=\max(0,x)$ and m is a Lagrange multiplier chosen to satisfy the average transmit power constraint $P_T$. Hence, the adaptation design can be cast into the following $n_T$-independent optimization problems.

The rate allocations $\{R_n(1), \ldots, R_n(Q)\}$ and the adaptation thresholds $\{H_n(1), \ldots, H_n(Q)\}$ are chosen such that the overall throughput of the nth subchannel is optimized or increased:

$$\bar{C}_n^* = \max_{\{R_n(1), \ldots, R_n(Q)\}\{H_n(1), \ldots, H_n(Q)\}} \sum_{q=1}^{Q} R_n(q) \varepsilon_{\lambda_n} [1 C^*(\lambda_n) > \quad (Eq\ 2.7)$$

$$R_n(q)) | \lambda_n \in H_n(q)] \alpha(q, n)$$

where $$C^*(\lambda) = \begin{cases} \log_2\left(\frac{|\lambda_n|}{\sigma_z^2 \mu}\right), & \text{if } |\lambda|^2 \ge \sigma_z^2 \mu \\ 0, & \text{otherwise} \end{cases}.$$

Note that the above optimization problem is equivalent to the classical vector quantization problem if we define a modified distortion measure $d(l_n, q)$ as $$d(l_n, q) = R_n(q) 1(C^*(l_n) > R_n(q)) \quad (Eq\ 2.8)$$

Hence, the optimization problem becomes $$\bar{C}_n^* = \max_{\{R_n(1),\ldots,R_n(Q)\}\{H_n(1),\ldots,H_n(Q)\}} \sum_{q=1}^{Q} R_n(q) e_{l_n}[d(l_n, q) \mid l_n \hat{I} H_n(q)] a(q, n) \quad \text{(Eq 2.9)}$$

which is identical to the classical vector quantization problem. Optimization problem 2.9 can be solved by the classical Lloyd iterative algorithm (careful choice of the initial point is needed for this algorithm).

1. Given the set of adaptation thresholds $\{H(1), \ldots, H(Q)\}$, find the optimal rate allocation $\{R_n(1), \ldots, R_n(Q)\}$. The optimal transmission mode allocation is given by $$\frac{\P e_{l_n}[d(l_n, q) \mid l_n \hat{I} H_n(q)]}{\P R_n(q)} = 0 \quad \text{(Eq 2.10)}$$

2. Given the set of rate allocations $\{R_n(1), \ldots, R_n(Q)\}$, find the optimal adaptation thresholds $\{H(1), \ldots, H(Q)\}$. The optimal adaptation threshold is given by $$H_n(q) = \{l : d(l,q)^3 d(l,q'), \forall q' \neq q\} \quad \text{(2.11)}$$

After the optimal partition $H_n(q)$ and the optimal rate allocation $R_n^*(q)$ are obtained for all $q=1, \ldots, Q$ and $n=1, \ldots, m^*$, the optimal transmission modes $A_n(q)=(r_c(n,q), M(n,q))$ is obtained.

The optimal learner component's 1102 selection of the optimal transmission (Tx) can depends on many factors, such as implementation complexity as well as robustness with respect to CSIR errors. For instance, in an aspect, the learner component 1102 can choose the Tx mode with the lowest constellation level M because it will be most robust to CSIR error. For example, if $R_n^*(q)=1$ bits per channel use, the set of feasible transmission modes is given by $\{(\frac{1}{4}, 16QAM), (\frac{1}{3}, 8PSK), (\frac{1}{2}, QPSK)\}$. In another aspect, for robustness consideration, the learner component 1102 selects the last mode.

Turning back to FIG. 11, media access platform 1100 further includes scenario identification component 1104 and heuristics component 1106. In an embodiment, the scenario identification component 1104 first identifies a current scenario. Then the heuristics component 1106 employs heuristics to further enhance adaptation determinations by the learner component 1102. One or more scenarios include hidden terminal starvation scenario, asymmetric starvation, and neighborhood starvation. The scenario identification component the following parameters in order to identify various starvation scenarios: probability of collision, successful transmission time, expected successful transmission time, and busy time. In order to detect hidden terminal starvation, the scenario identification component 1104 examines the probability of collision $p_c$.

The scenario identification component 1104 detects asymmetric starvation as follows. The scenario identification component keeps time from the beginning of transmission until it can decrement a backoff time. If a successful transmission ($t_s$) lasts longer than expected ($\bar{t}_s$) (the expected duration of a collision or a successful transmission can be easily calculated), a neighboring terminal will have started transmitting during the timed/observed transmission. This means that the neighboring terminal was not listening to the observed terminal transmission, but the observed terminal was listening to neighboring transmission. The above scenario equates to asymmetric starvation. The scenario identification component 1104 detects neighborhood starvation by observing long busy times ($t_b$).

According to an embodiment, in order to determine a scenario from measured parameters, the scenario component can employ a look up table stored in memory 1108 having stored therein predefined correlations between values associated with the parameters (probability of collision, successful transmission time, expected successful transmission time, and busy time, and a starvation scenario) and a scenario. In another aspect, the scenario identification component 1106 can employ an artificial intelligence component (not shown) to infer scenarios. Artificial intelligence component can utilize explicitly and/or implicitly trained classifiers in connection with performing inference and/or probabilistic determinations and/or statistical-based determinations.

The heuristic component 1106 is configured to determine heuristic probabilities for each scenario and combinations of scenarios. In an aspect, the recommendation the heuristic component makes for each scenario, no starvation, hidden node starvation, asymmetric starvation, and neighborhood starvation, are outlined in Table 1. For instance, when a terminal is dealing with asymmetric starvation, it can either increase the power or decrease the carrier sense threshold in order to alleviate this situation.

TABLE 1

Heuristic recommendation.

| Starvation Mechanism | Recommend | Neutral | Avoid |
|---|---|---|---|
| No Starvation | Increase rate Decrease power | Stay | Decrease Tcs |
| Hidden Node Starvation | Increase power Decrease Tcs | | Increase rate Stay |
| Asymmetric Starvation | Increase power Decrease Tcs | | Stay |
| Neighborhood Starvation | Increase Tcs | | Stay |

According to an embodiment, the heuristic component can employ a look up table stored in memory 1108 having stored therein predefined recommendations for each scenario. In another aspect, the heuristic component 1106 can employ an artificial intelligence component (not shown) to infer heuristic probabilities. Artificial intelligence component can utilize explicitly and/or implicitly trained classifiers in connection with performing inference and/or probabilistic determinations and/or statistical-based determinations.

As noted supra, The Q-learning algorithm employed by the learner component 1102 updates the estimate for each action, but in fact does not specify what actions should be taken. In an aspect, in order to specify what actions should be taken, the learner component 1102 simulated annealing. The nodes can explore actions using a soft-max policy, where each terminal selects an action with a probability given by Boltzmann distribution:

$$p_Q(s_c, s_n) = \frac{e^{\frac{Q(s_c, s_n)}{T}}}{\sum_{\forall s \in A(s_c)} e^{\frac{Q(s_c, s)}{T}}} \quad \text{(Eq 2.3)}$$

where T is the temperature that controls the amount of exploration. For higher values of T the actions are equiprobable. According to an embodiment, once the heuristic component 1106 determines heuristic probabilities, the learner component 1102 then can integrate the heuristic probabilities into the Q-learning mechanism. Accordingly (2.3) is redefined as follows:

$$p_{HQ}(s_c, s_n) = \frac{p_H(s_c, s_n)e^{\frac{Q(s_c,s_n)}{T}}}{\sum_{\forall s \in A(s_c)} p_H(s_c, s_n)e^{\frac{Q(s_c,s)}{T}}} \quad \text{(Eq 2.12)}$$

where $p_H(s_c,s_n)$ is the recommendation probability which is defined as:

$$w_H(a^+) = h_b,$$
$$w_H(a^0) = 1,$$
$$w_H(a^-) = 1/h_b,$$
$$p_H(a) = \frac{w_H(a)}{\sum_{i=1}^{n_a(s_c)} w_H(i)}.$$

where $w_H$ is the heuristic weight, $a^+$ is a recommended action, $a^0$ is a neutral action and $a^-$ is an action to be avoided. The number of actions in a certain state is denoted as $n_a(s_c)$. And figure 2.5 is the procedure of scenario identification, figure 2.6 is the flowchart of the proposed algorithm.

Figure 12:
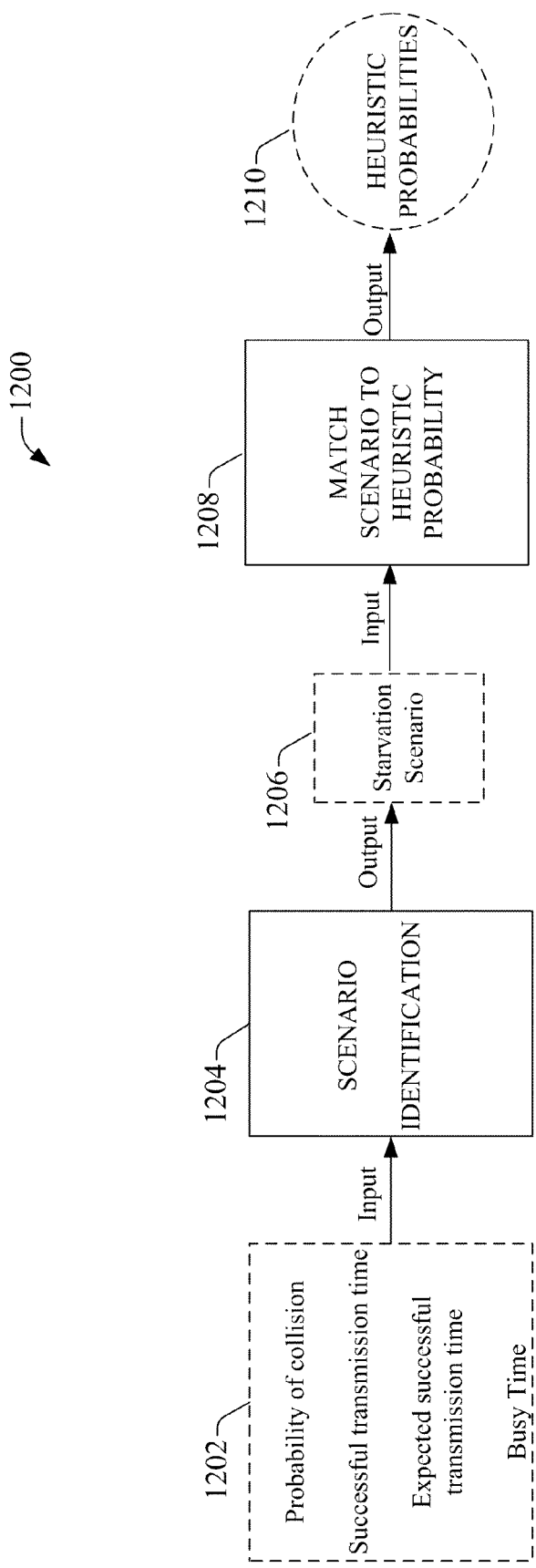
FIG. 12 presents a flow diagram of scenario identification and heuristic probability determination.

FIG. 12 presents a flow diagram of the procedure of scenario identification and heuristic probability determination. At 1202 input parameters including probability of collision, successful transmission time, expected successful transmission time and busy time are observed and collected by the scenario identification component 1104. The input parameters are then employed by the scenario identification component 1104 in scenario identification 1204. In an aspect, the scenario identification can employ a look up table stored in memory 1108 that associates input parameters with various scenarios. At 1206, a particular starvation scenario is identified. The starvation scenario is then employed by the heuristic component 1106 to determine a heuristic probability related to suggested adaptation recommendations for the learner component at 1208. For example, adaptation recommendations include increasing or decreasing Tx rate, Tx power, Tcs and/or Tx mode. Once the heuristic probability is identified, it is output at 1210. The heuristic probability can the be further employed by the learner component 1102 to determine the appropriate adaptation of parameters Tx rate, Tx power, Tcs and/or Tx mode for a given node.

Turning back to FIG. 11, further included in the MAC adaptation platform 1100 is adaptation component 1112. Adaptation component 1112 is configured to employ the adaptation determination of the learner component. In particular, the adaptation component implement adaptation of Tx rate, Tx power, Tcs and/or Tx mode at a given node in order to effectuate increased throughput of the WiFi system in which the MAC adaptation platform 1100 is employed.

Figure 13:
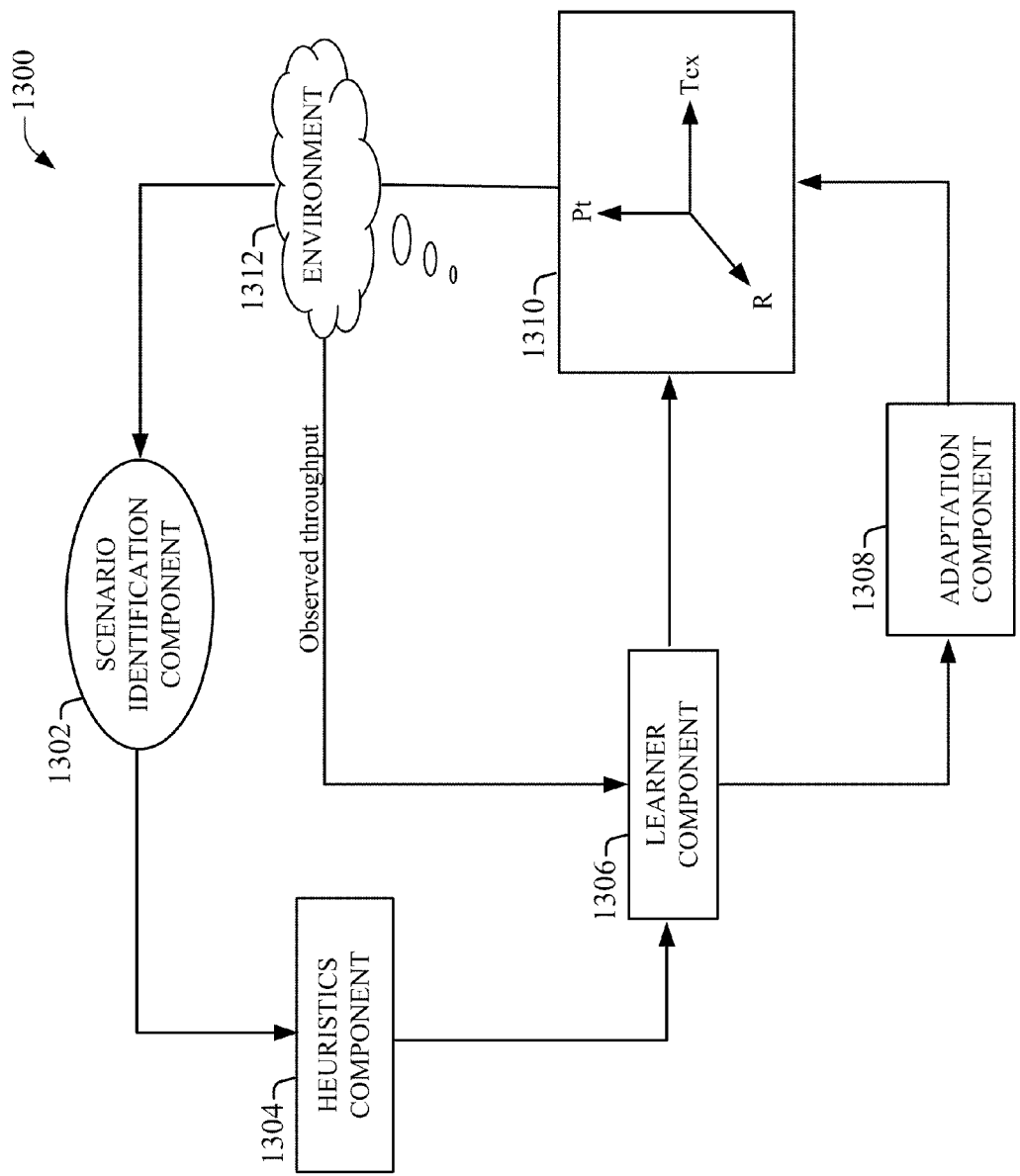
FIG. 13 illustrates a flow diagram of a MACLE algorithm in accordance with an embodiment.

FIG. 13 presents a block diagram of the general framework of the MACLE algorithm in terms of the components which performs the operations of the MACE algorithm. The learner component 1306 interprets how the environment reacts to selected node adaptations, and determines an appropriate next adaptation with respect to Tx rate, Tx power, Tcs and/or Tx mode. In particular, the learner 1306 receives as inputs, both throughput and heuristic probabilities. (In other IEEE 802.11 scenarios, the only feedback from the environment is the observed throughput). The heuristic probabilities are the output of the heuristics component 1304. As discussed with respect to FIG. 12, the scenario identification component 1302 identifies a starvation scenario from the environment and the heuristic component 1304 makes a heuristic determination regarding possible adaptations to correct the scenario, i.e reduce starvation and increase throughput.

The learner component 1306 then continuously estimates future payoffs regarding an action for a node and determines the optimal action for the node from any state via Q-learning and simulated annealing. The Q-learning process determines future payoffs for each action. In aspect, the action to select is the action with the highest Q-value. In another aspect, simulated annealing is employed to determine what action should be taken. In an aspect, the simulated annealing process applies heuristic probabilities into the determination of the action that will have the most increase of throughput. Once the learner component 1306 determines an action, the adaptation component 1308 implements the action. The output is the modified state of each of the node 1308. As the states of nodes are modified, the total WiFi environment 1312 is effected resulting in a modification of throughput. As iterations of the MACLE algorithm are employed for each node, throughput will increase until the algorithm reaches convergence. The MACLE algorithm as embodied in FIG. 13 can be performed for each node in the WiFi environment and can be performed repeatedly. In summary, the MACLE algorithm operates at a microscopic time scale (per-packet level) to jointly adjust the transmit power, transmit data rate as well as carrier sensing thresholds based on the instantaneous throughput and scenario identification.

Figure 14:
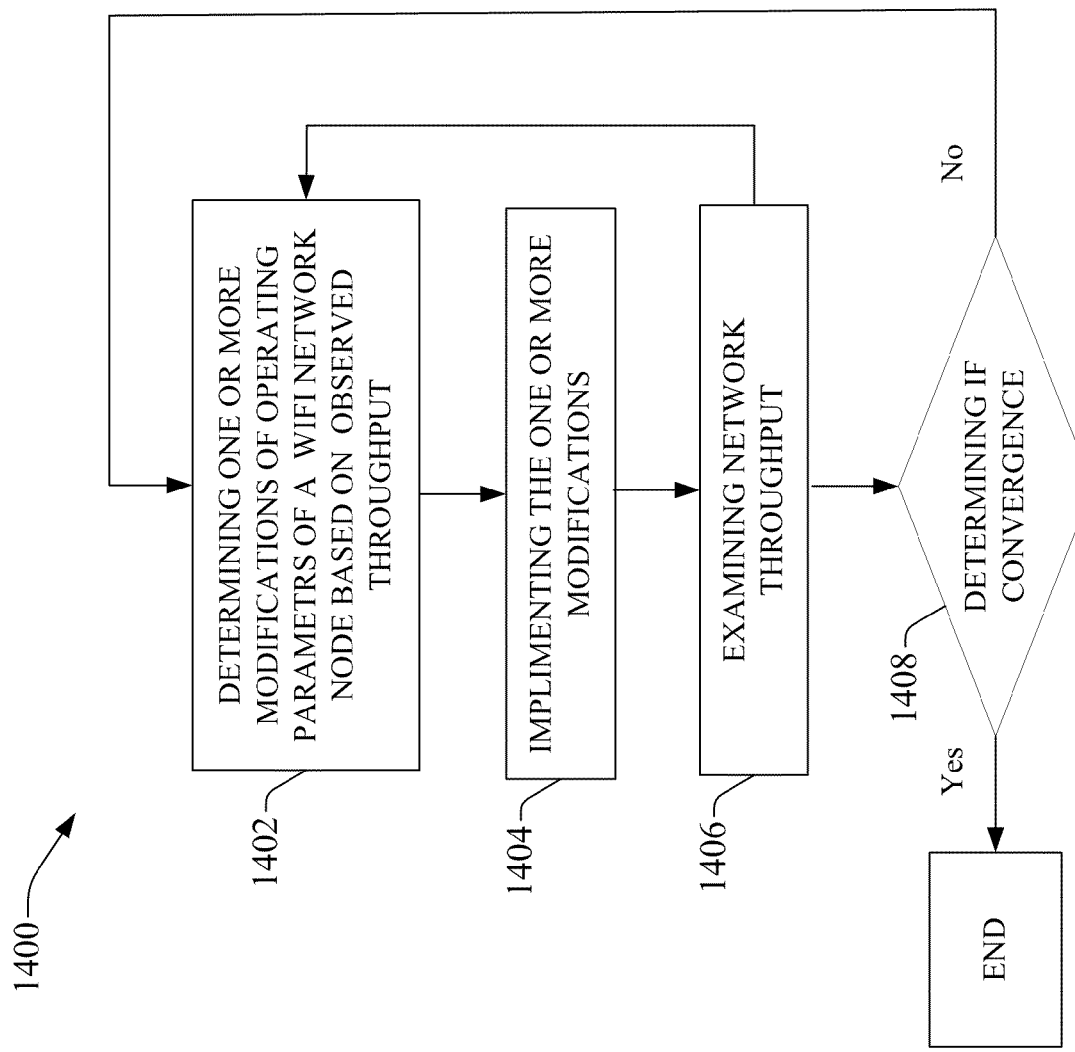
FIG. 14 presents a process of a MACLE algorithm in accordance with an embodiment.

FIG. 14 presents a process 1400 for increasing throughput of a WiFi network according to aspects of the subject disclosure. Process 1400 can be implemented at each network node. It should be appreciated that s 1402 through 1408 can be repeated several times until at each network node until convergence is reached. At 1402, one or more modifications of operating parameters of a WiFi network node are determined based on observed throughput. For example, in an aspect, Q-learning is employed to determine modifications of operating parameters based on observed throughput. At 1402, the one more modifications are implemented. For example, one or more of the parameters Tx rate, Tx power, Tcs and/or Tx mode are modified at the node. At 1406, network throughput is examined in light of the modifications. At 1408, whether convergence has been reached is determined. Convergence is determined when additional parameter modification possibilities no longer positively affect network throughput. If there is convergence, then process 1400 ends. If there is no convergence then process 1400 continues until convergence is reached.

Figure 15:
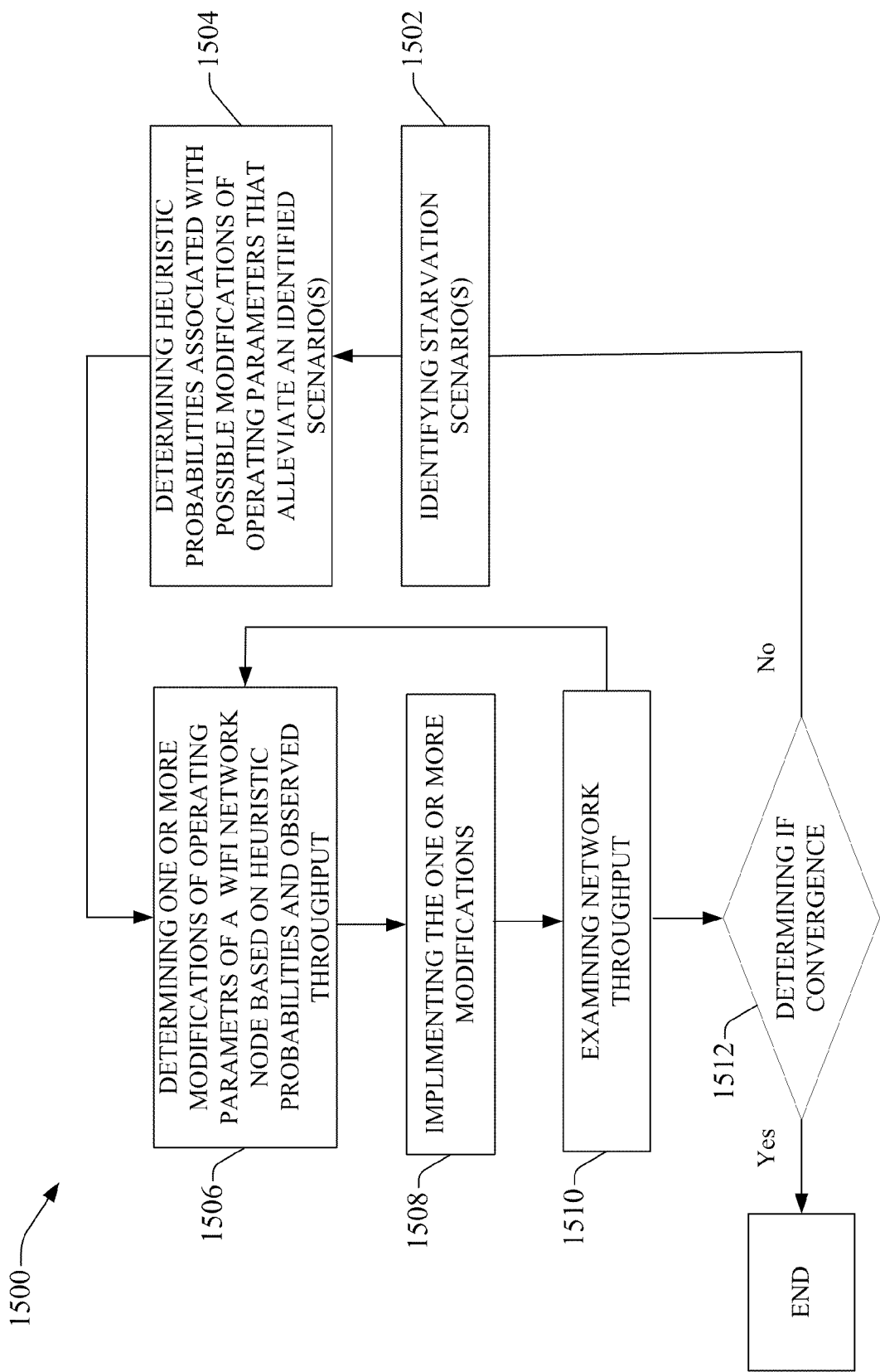
FIG. 15 presents another process of a MACLE algorithm in accordance with an embodiment.

FIG. 15 presents another embodiment of a process 1500 for increasing throughput of a WiFi network. Process 1500 can be implemented at each network node. It should be appreciated that s 1502 through 1512 can be repeated several times until at each network node until convergence is reached. At 1502, starvation scenarios are identified. At 1504 heuristic probabilities associated with possible modifications of operating parameters that alleviate an identified scenario are determined. At 1506, one or more modifications of operating parameters of a WiFi network node are determined based on the heuristic probabilities and observed throughput. For example, in an aspect, Q-learning is employed to determine possible modifications of operating parameters based only on observed throughput and heuristic probabilities are further employed in making a final decision on the one or more modifications to make. At 1508, the one more modifications are implemented. For example, one or more of the parameters Tx rate, Tx power, Tcs and/or Tx mode are modified at the node. At 1510, network throughput is examined. At 1512, convergence is determined. Convergence is determined when additional parameter modification possibilities no longer positively affect network throughput. If there is convergence, then process 1500 ends. If there is no convergence then process 1500 continues until convergence is reached.

The MACLE algorithm described herein has proved to be an effective tool for increasing throughput of a WiFi system. Performance of the proposed algorithm was evaluated through an extensive simulation study with the network simulator ns-2.29. All simulations were done using the simple path loss model of ns-2.29 without shadowing. CSMA/CA mode in ns-2.29 was enabled. The following four rates were available: 9 Mbps, 18 Mbps, 36 Mbps and 54 Mbps. The SINR thresholds for successful reception at these rates were respectively: 7.78 dB, 10.79 dB, 18.80 dB and 24.56 dB. The following power levels were used: 33.125 mW, 66.25 mW, 125 mW and 250 mW.

The traffic model included three APs (similar to the number of the Altai B8 Access Points) and four clients in the system. The APs formed a triangle. The clients were distributed according to a spatial Poisson point process. Some client nodes were deployed to cause hidden nodes starvation, asymmetric starvation and/or neighborhood starvation. Clients sent uplink traffic using the DCF mode. For the IEEE MAC protocol, the following parameters were employed. The minimal contention window was chosen as 15 and the maximal contention window was set to 1023. The short inter frame space (SIFS) was 16 μs. A backoff slot was equal to 9 μs and the length of the preamble was equal to 16 μs. The length of the 802.11 header and the acknowledgment were 28 bytes and 14 bytes, respectively. The IEEE 802.11 packets wee assumed to contain a payload of 1024 bytes.

Spatial Backoff (SB) was determined as the baseline. This algorithm tunes both rate and carrier sense threshold to optimize individual throughput in IEEE 802.11 networks but without tuning the transmit power. The proposed scheme was MACLE. An noted supra, MACLE is employed by MAC adaptation layer, which operates at a microscopic time scale (per-packet level) to jointly adjust the transmit power, transmit data rate as well as carrier sensing thresholds based on the instantaneous throughput and scenario identification.

Increased throughput over SB was determined. MACLE significantly increased throughput as compared to the SB. However MACLE also caused more unfairness in the network as terminals were less inclined to listen to each other and hidden nodes become more prominent. By allowing the terminals to scale down power, MACLE compensates for this and reaches the same levels of fairness as SB. Most importantly, MACLE was shown to outperform SB by 60% in throughput, and MACLE was found to be more power saving. In addition, the impact of heuristics with MACLE significantly increased convergence speed Section III—PLI and MACLE Discussed above where two systems and methods of optimizing throughput of a WiFi system. The first method involved an interference adaptation layer, employing a PLI algorithm. The PLI algorithm operates at a macroscopic time scale (involving plenty of WiFi access points). The PLI algorithm aims to solve a topology control optimization problem, where access points (APs) activate their antenna sectors (sectors on/off patterns) for each WiFi channel to optimize network capacity. The PLI algorithm is based on an unsupervised clustering of APs that relies on parameters measurements such as noise level, channel utilization, packets error probability and busy time ratio, on multiple antenna patterns and multiple channels of each AP. The interference adaptation layer employs a measurement protocol to measure parameters of these sectors on/off patterns for each channel and an iterative topology control protocol that uses this information to optimize the network. The second method involved a MAC adaptation layer employing a MACLE algorithm. The MAC adaptation layer, operates at a microscopic time scale (per-packet level) to jointly adjust the transmit power, transmit data rate as well as carrier sensing thresholds based on the instantaneous throughput and scenario identification and employed a theory of "multi-agent learning" for scenario identification.

According to an embodiment, the PLI algorithm and the MACLE algorithm can be combined in order to affect network throughput at both the physical layer and the MAC layer. In another aspect, by employing both the PLI algorithm and the MACLE in a WiFi network, optimization of the network is accounted for on both a macroscopic time scale and a microscopic time scale.

Figure 16:
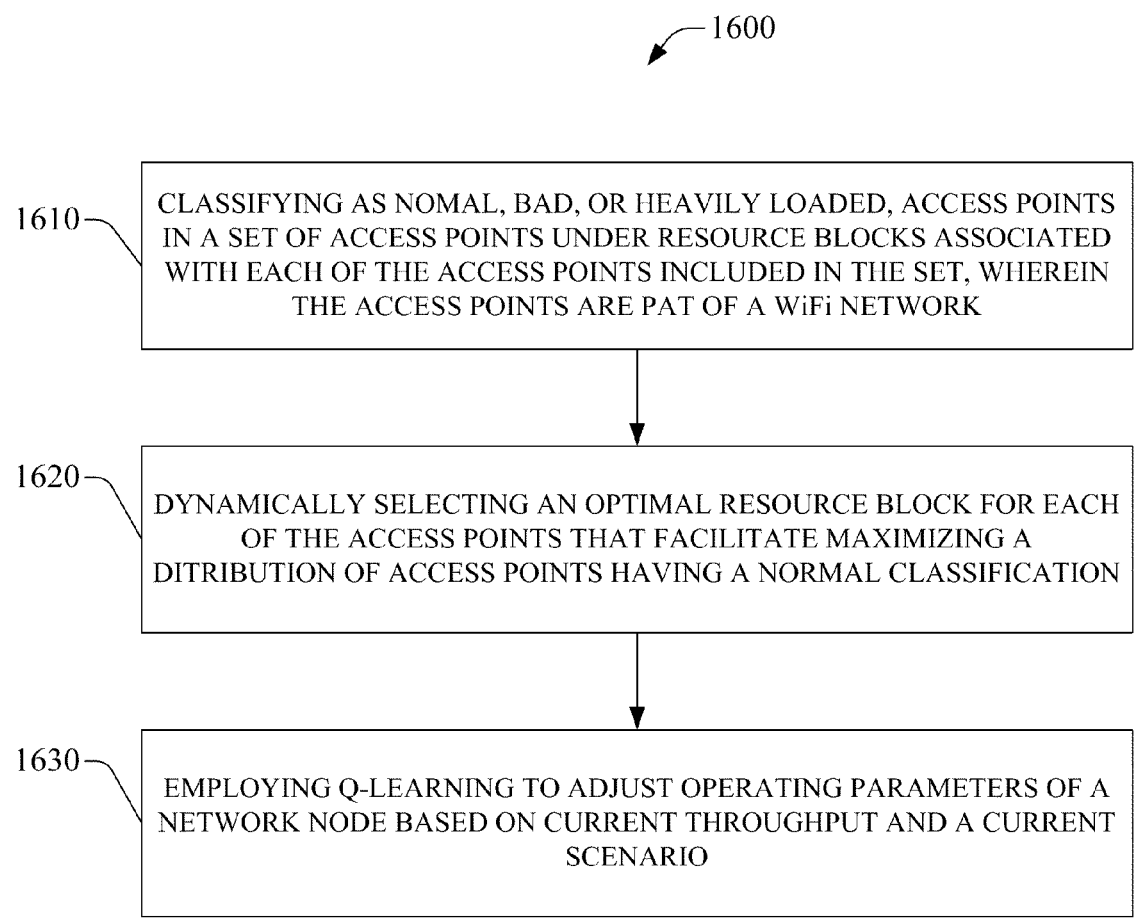
FIG. 16 presents a process for increasing throughput of a WiFi system by employing cross-layer optimization control.

FIG. 16 presents a method 1600 for increasing network throughput that involves aspects of the PLI algorithm and the MACLE algorithm. At 1610, access points in a set of access points are classified as normal, bad, or heavily loaded, under resource blocks associated with each of the access points included in the set, wherein the access point are part of a WiFi network. At 1620 an optimal resource block is dynamically selected for each of the access points that facilitate increasing the number of access points having a normal classification. At 1630, Q-learning is employed to adjust operating parameters of a network node based on current throughput and a current scenario.

Performance of combined algorithms PLI and MACLE in was evaluated in frequency-division duplexing (FDD) system through an extensive simulation study with the network simulator ns-2.29 and real-life traffic measurements as inputs. The traffic model involved three APs (similar to the number of the Altai B8 Access Points) and four clients in the system. The APs formed a triangle. The clients were distributed according to a spatial poisson point process.

The APs sent downlink traffic to clients through UDP agent and there was an EXPOO traffic agent for each AP. An EXPOO traffic generator was used to generate packets and then collect measurement data. The parameters of EXPOO traffic were packet size 200-bytes, burst time 2 s, idle time 1 s and date rate 9 Mb/s. The queue mode was 100 ms drop tail. Clients sent uplink traffic using the DCF mode. For the IEEE MAC protocol, the following parameters were used. The minimal contention window was chosen as 15 and the maximal contention window is set to 1023. The short inter frame space (SIFS) was 16 μs. A backoff slot was set equal to 9 μs and the length of the preamble was set equal to 16 μs. The length of the 802.11 header and the acknowledgment were 28 bytes and 14 bytes, respectively. The IEEE 802.11 packets were assumed to contain a payload of 1024 bytes.

Some client nodes were deployed as hidden nodes and some client nodes caused the concerned AP to be heavily loaded or bad. And some other systems' clients caused hidden nodes starvation, asymmetric starvation or neighborhood starvation. The downlink baseline and uplink baseline were the same as baselines in the individual PLI and MACLE simulation experiments discussed infra. The proposed schemes for downlink and uplink were the same as the proposed schemes in the individual PLI and MACLE simulation experiments discussed infra.

The system throughput was captured for downlink, in the above WiFi infrastructure at an interval of 0.5 seconds. A classification (normal state, bad state or Heavily loaded state) of the APs both in the baseline and in the proposed scheme was obtained through the method of stepwise-optimal hierarchical clustering. The states of APs wer induced by the traffic and interference dynamics in the client—AP—path loss—fading dynamics and they were random.

With respect to downlink, the system throughput was determined for the following three scenarios. In scenario 1 the openloop baseline scheme had two APs in NORMAL STATE and one AP in BAD STATE. In the second scenario, the open loop baseline scheme had two APs in NORMAL STATE and one AP in HEAVILY LOADED STATE. In the third scenario, the baseline open-loop scheme had one AP in NORMAL, one in BAD, one in HEAVILY LOADED states. However, using the combined PLI and MACLE algorithm scheme, all three APs operated in the NORMAL STATE despite the random disturbance from the hidden node clients. Significant average system throughput gain was observed for the three scenarios. For the first scenario, the average system throughput gain was 1.79 Mb/s. For the second scenario, the average system throughput gain was 1.64 Mb/s, and for the third scenario, the average system throughput gain was 2.03 Mb/s.

With respect to uplink after three seconds throughput stayed static. When comparing the throughput gain hence in the first three seconds MACLE significantly increased throughput as compared to the SB. For the first scenario, MACLE outperformed spatial back-off by 53% in throughput in MB/s. For the second scenario, MACLE outperformed spatial back-off by 62% in throughput in MB/s, and for the third scenario.

Figure 17:
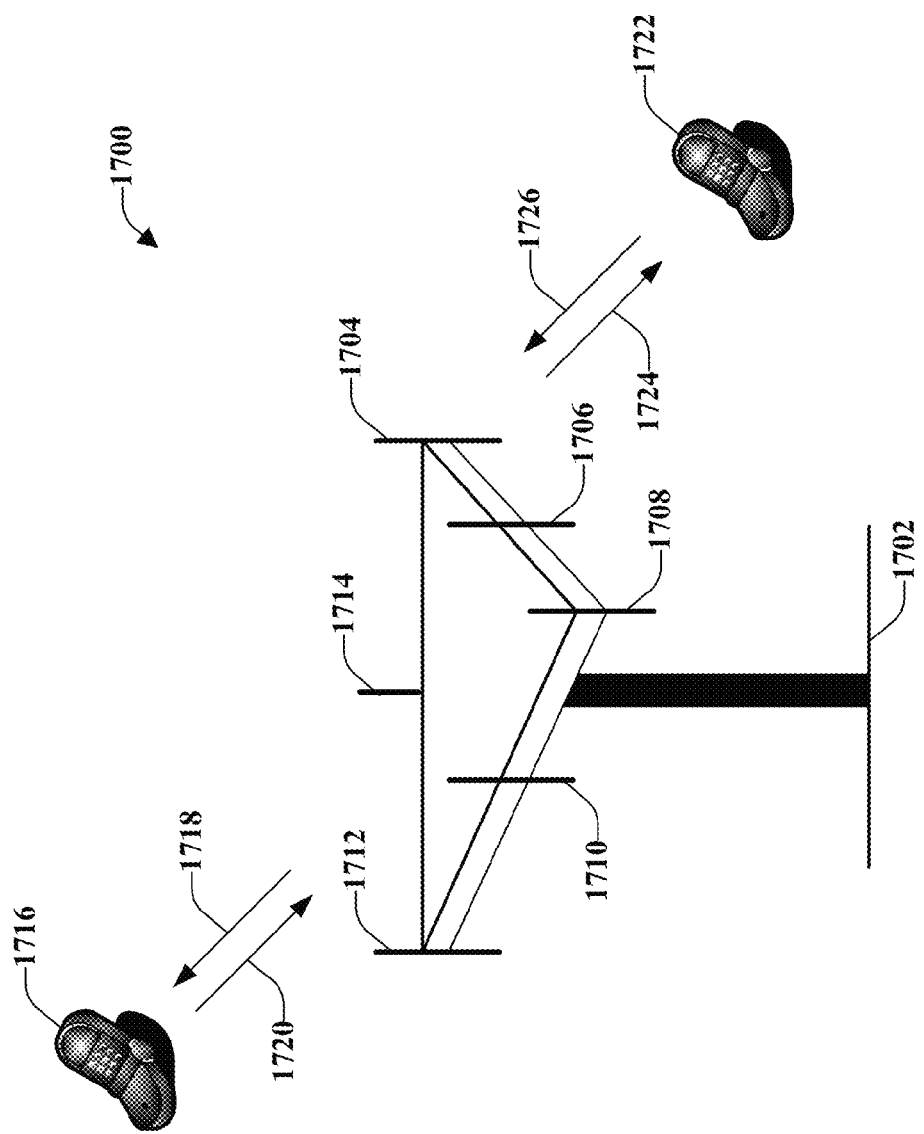
FIG. 17 illustrates a block diagram of an exemplary embodiment of an access point to implement and exploit one or more features or aspects of the disclosed subject matter.

Referring now to FIG. 17 a multiple access wireless communication system 1700 according to one or more aspects is illustrated. A wireless communication system 1700 can include one or more base stations in contact with one or more user devices. Each base station provides coverage for a plurality of sectors. A three-sector base station 1702 is illustrated that includes multiple antenna groups, one including antennas 1704 and 1706, another including antennas 17017 and 1710, and a third including antennas 1712 and 1714. According to the figure, only two antennas are shown for each antenna group, however, more or fewer antennas may be utilized for each antenna group. Mobile device 1716 is in communication with antennas 1712 and 1714, where antennas 1712 and 1714 transmit information to mobile device 1716 over forward link 1718 and receive information from mobile device 1716 over reverse link 1720. Forward link (or downlink) refers to communication link from base stations to mobile devices, and reverse link (or uplink) refers to communication link from mobile devices to base stations. Mobile device 1722 is in communication with antennas 1704 and 1706, where antennas 1704 and 1706 transmit information to mobile device 1722 over forward link 1724 and receive information from mobile device 1722 over reverse link 1726. In a FDD system, for example, communication links 1718, 1720, 1724, and 1726 might utilize different frequencies for communication. For example, forward link 1718 might use a different frequency than the frequency utilized by reverse link 1720.

Each group of antennas and/or the area in which they are designated to communicate may be referred to as a sector of base station 1702. In one or more aspects, antenna groups each are designed to communicate to mobile devices in a sector or the areas covered by base station 1702. A base station may be a fixed station used for communicating with mobile devices.

In communication over forward links 1718 and 1724, transmitting antennas of base station 1702 can utilize beamforming in order to improve a signal-to-noise ratio of forward links for different mobile devices 1716 and 1722. Also, a base station utilizing beamforming to transmit to mobile devices scattered randomly through its coverage area might cause less interference to mobile devices in neighboring cells than the interference that can be caused by a base station transmitting through a single antenna to all mobile devices in its coverage area.

Figure 18:
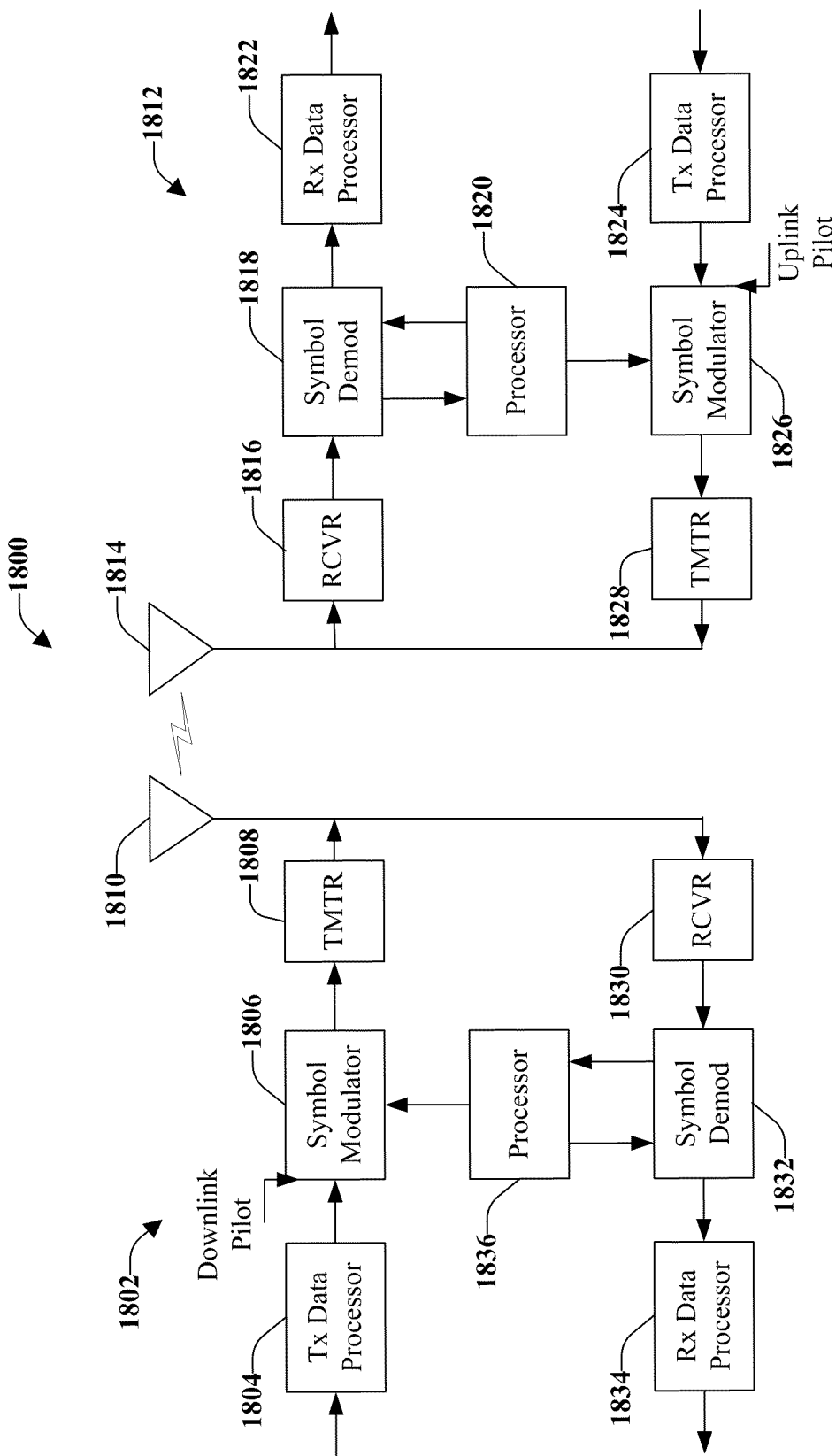
FIG. 18 is a block diagram of an exemplary embodiment of a mobile network platform to implement and exploit various features or aspects of the disclosed subject matter.

FIG. 18 illustrates an exemplary wireless communication system 1800, according to various aspects. Wireless communication system 1800 depicts one base station and one terminal for sake of brevity. However, it is to be appreciated that system 1800 can include more than one base station or access point and/or more than one terminal or user device, wherein additional base stations and/or terminals can be substantially similar or different from the exemplary base station and terminal described below. In addition, it is to be appreciated that base station and/or terminal can employ various aspects described herein to facilitate wireless communication there between.

On a downlink, at access point 1802, a transmit (TX) data processor 1804 receives, formats, codes, interleaves, and modulates (or symbol maps) traffic data and provides modulation symbols ("data symbols"). A symbol modulator 1806 receives and processes data symbols and pilot symbols and provides a stream of symbols. Symbol modulator 1806 multiplexes data and pilot symbols and obtains a set of N transmit symbols. Each transmit symbol may be a data symbol, a pilot symbol, or a signal value of zero. Pilot symbols may be sent continuously in each symbol period. Pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 1808 receives and converts the stream of symbols into one or more analog signals and further conditions (e.g., amplifies, filters, frequency upconverts, and so on) analog signals to generate a downlink signal suitable for transmission over wireless channel. Downlink signal is then transmitted through an antenna 1810 to terminals. At terminal 1812, an antenna 1814 receives downlink signal and provides a received signal to a receiver unit (RCVR) 1816. Receiver unit 1816 conditions (e.g., filters, amplifies, frequency downconverts, and so forth) received signal and digitizes conditioned signal to obtain samples. A symbol demodulator 1818 obtains N received symbols and provides received pilot symbols to a processor 1820 for channel estimation. Symbol demodulator 1818 further receives a frequency response estimate for the downlink from processor 1820 and performs data demodulation on received data symbols to obtain data symbol estimates (which are estimates of transmitted data symbols). Further, symbol demodulator 1818 provides data symbol estimates to a RX data processor 1822, which demodulates (e.g., symbol demaps), deinterleaves, and decodes the data symbol estimates to recover transmitted traffic data. Processing by symbol demodulator 1818 and RX data processor 1822 is complementary to processing by symbol modulator 1806 and TX data processor 1804, respectively, at access point 1802.

On uplink, a TX data processor 1824 processes traffic data and provides data symbols. A symbol modulator 1826 receives and multiplexes data symbols with pilot symbols, performs modulation, and provides a stream of symbols. A transmitter unit 1828 receives and processes the stream of symbols to generate an uplink signal, which is transmitted by antenna 1814 to access point 1802.

At access point 1802, uplink signal from terminal 1812 is received by antenna 1810 and processed by a receiver unit 1830 to obtain samples. A symbol demodulator 1832 processes the samples and provides received pilot symbols and data symbol estimates for uplink. A RX data processor 1834 processes data symbol estimates to recover traffic data transmitted by terminal 1812. A processor 1836 performs channel estimation for each active terminal transmitting on uplink.

Processors 1836 and 1820 direct (e.g., control, coordinate, manage, and so forth) operation at access point 1802 and terminal 1812, respectively. Respective processors 1836 and 1820 can be associated with memory units (not shown) that store program codes and data. Processors 1836 and 1820 can also perform computations to derive frequency and impulse response estimates for uplink and downlink, respectively.

For a multiple-access system (e.g., FDMA, OFDMA, CDMA, TDMA, and the like), multiple terminals can transmit concurrently on uplink. For such a system, pilot subbands may be shared among different terminals. Channel estimation techniques may be used in cases where pilot subbands for each terminal span the entire operating band (possibly except for band edges). Such a pilot subband structure would be desirable to obtain frequency diversity for each terminal. The techniques described herein may be implemented by various means. For example, these techniques may be implemented in hardware, software, or a combination thereof. For a hardware implementation, processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform functions described herein, or a combination thereof. With software, implementation can be through modules (e.g., procedures, functions, and so on) that perform functions described herein. Software codes may be stored in memory unit and executed by processors 1836 and 1820.

Figure 19:
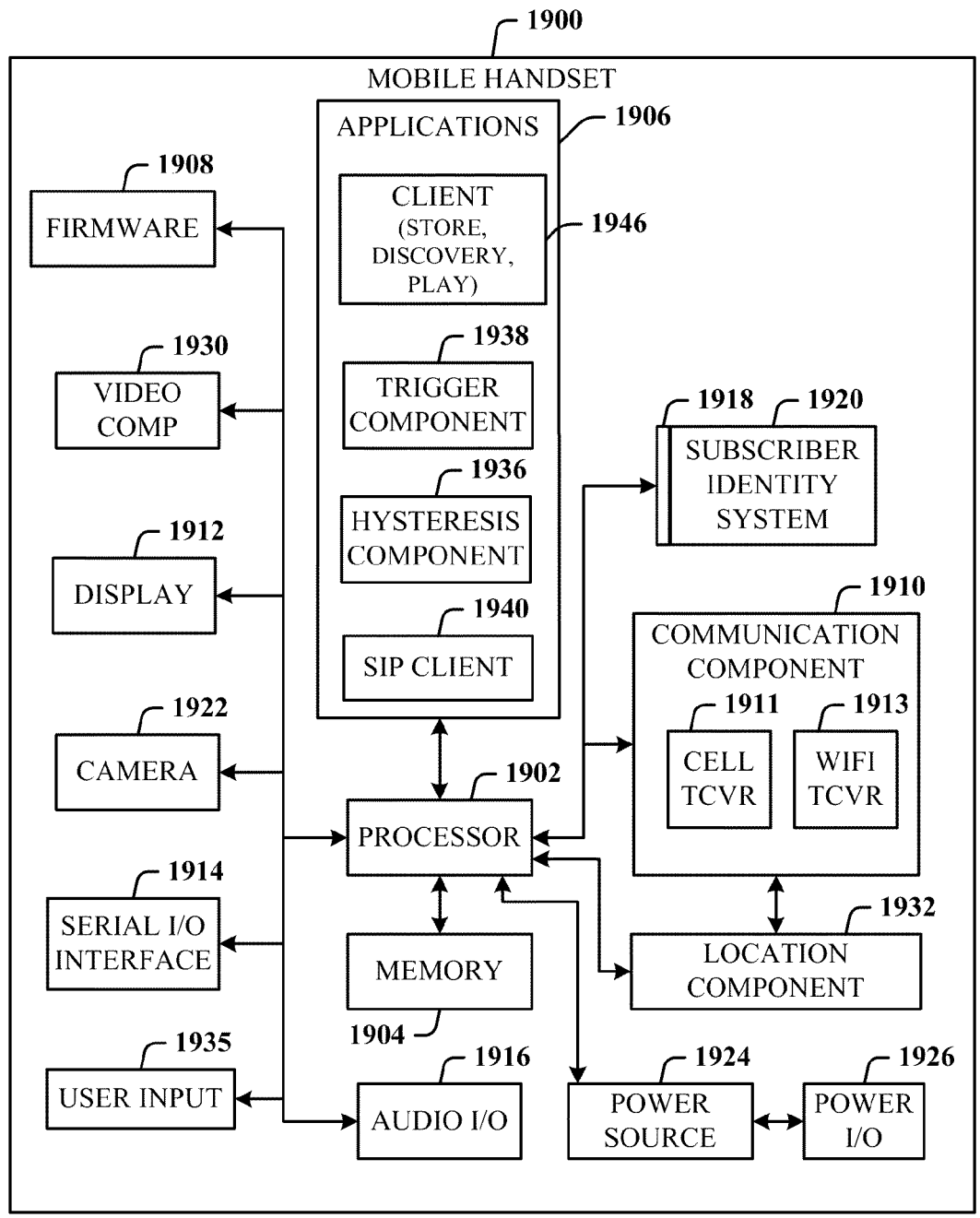
FIG. 19 illustrates an example of a device, a client device in accordance with the embodiments disclosed herein.

FIG. 19 illustrates a schematic block diagram of an exemplary device 1900 capable of employing the subject system in accordance with some embodiments of the invention. The device is a mobile handset 1900 in order to provide additional context for various aspects thereof, FIG. 19 and the following discussion are intended to provide a brief, general description of a suitable environment 1900 in which the various aspects can be implemented. While the description includes a general context of computer-executable instructions, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the inventive methods can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer-readable media. Computer readable media can be any available media that can be accessed by the computer and includes both volatile and non-volatile media, removable and non-removable media. By way of example and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1900 includes a processor 1902 for controlling and processing all onboard operations and functions. A memory 1904 interfaces to the processor 1902 for storage of data and one or more applications 1906 (e.g., a video player software, user feedback component software, . . . ). Other applications can include voice recognition of predetermined voice commands that facilitate initiation of the user feedback signals. The applications 1906 can be stored in the memory 1904 and/or in a firmware 1908, and executed by the processor 1902 from either or both the memory 1904 or/and the firmware 1908. The firmware 1908 can also store startup code for execution in initializing the handset 1900. A communications component 1910 interfaces to the processor 1902 to facilitate wired/wireless communication with external systems, e.g., cellular networks, VoIP networks, and so on. Here, the communications component 1910 can also include a suitable cellular transceiver 1911 (e.g., a GSM transceiver) and an unlicensed transceiver 1913 (e.g., WiFi, WiMax) for corresponding signal communications. The handset 1900 can be a device such as a cellular telephone, a PDA with mobile communications capabilities, and messaging-centric devices. The communications component 1910 also facilitates communications reception from terrestrial radio networks (e.g., broadcast), digital satellite radio networks, and Internet-based radio services networks.

The handset 1900 includes a display 1912 for displaying text, images, video, telephony functions (e.g., a Caller ID function), setup functions, and for user input. The display 1912 can also accommodate the presentation of multimedia content (e.g., music metadata, messages, wallpaper, graphics, . . . ). A serial I/O interface 1914 is provided in communication with the processor 1902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1900, for example. Audio capabilities are provided with an audio I/O component 1916, which can include a speaker for the output of audio signals related to, for example, indication that the user pressed the proper key or key combination to initiate the user feedback signal. The audio I/O component 1916 also facilitates the input of audio signals through a microphone to record data and/or telephony voice data, and for inputting voice signals for telephone conversations.

The handset 1900 can include a slot interface 1918 for accommodating a SIC (Subscriber Identity Component) in the form factor of a card Subscriber Identity Module (SIM) or universal SIM 1920, and interfacing the SIM card 1920 with the processor 1902. However, it is to be appreciated that the SIM card 920 can be manufactured into the handset 1900, and updated by downloading data and software thereinto.

The handset 1900 can process IP data traffic through the communication component 1910 to accommodate IP traffic from an IP network such as, for example, the Internet, a corporate intranet, a home network, a person area network, etc., through an ISP or broadband cable provider. Thus, VoIP traffic can be utilized by the handset 1900 and IP-based multimedia content can be received in either an encoded or decoded format.

A video processing component 1922 (e.g., a camera) can be provided for decoding encoded multimedia content. The handset 1900 also includes a power source 1924 in the form of batteries and/or an AC power subsystem, which power source 1924 can interface to an external power system or charging equipment (not shown) by a power I/O component 1926.

The handset 1900 can also include a video component 1930 for processing video content received and, for recording and transmitting video content. A location tracking component 932 facilitates geographically locating the handset 1900. As described hereinabove, this can occur when the user initiates the feedback signal automatically or manually. A user input component 1934 facilitates the user initiating the quality feedback signal. The input component can include such conventional input device technologies such as a keypad, keyboard, mouse, stylus pen, and touch screen, for example.

Referring again to the applications 1906, a hysteresis component 1936 facilitates the analysis and processing of hysteresis data, which is utilized to determine when to associate with the access point. A software trigger component 1938 can be provided that facilitates triggering of the hysteresis component 1938 when the WiFi transceiver 1913 detects the beacon of the access point. A SIP client 940 enables the handset 1900 to support SIP protocols and register the subscriber with the SIP registrar server. The applications 1906 can also include a client 1942 that provides at least the capability of discovery, play and store of multimedia content, for example, music.

The handset 1900, as indicated above related to the communications component 910, includes an indoor network radio transceiver 1913 (e.g., WiFi transceiver). This function supports the indoor radio link, such as IEEE 802.11, for the dual-mode GSM handset 1900. The handset 1900 can accommodate at least satellite radio services through a handset that can combine wireless voice and digital radio chipsets into a single handheld device.

Figure 20:
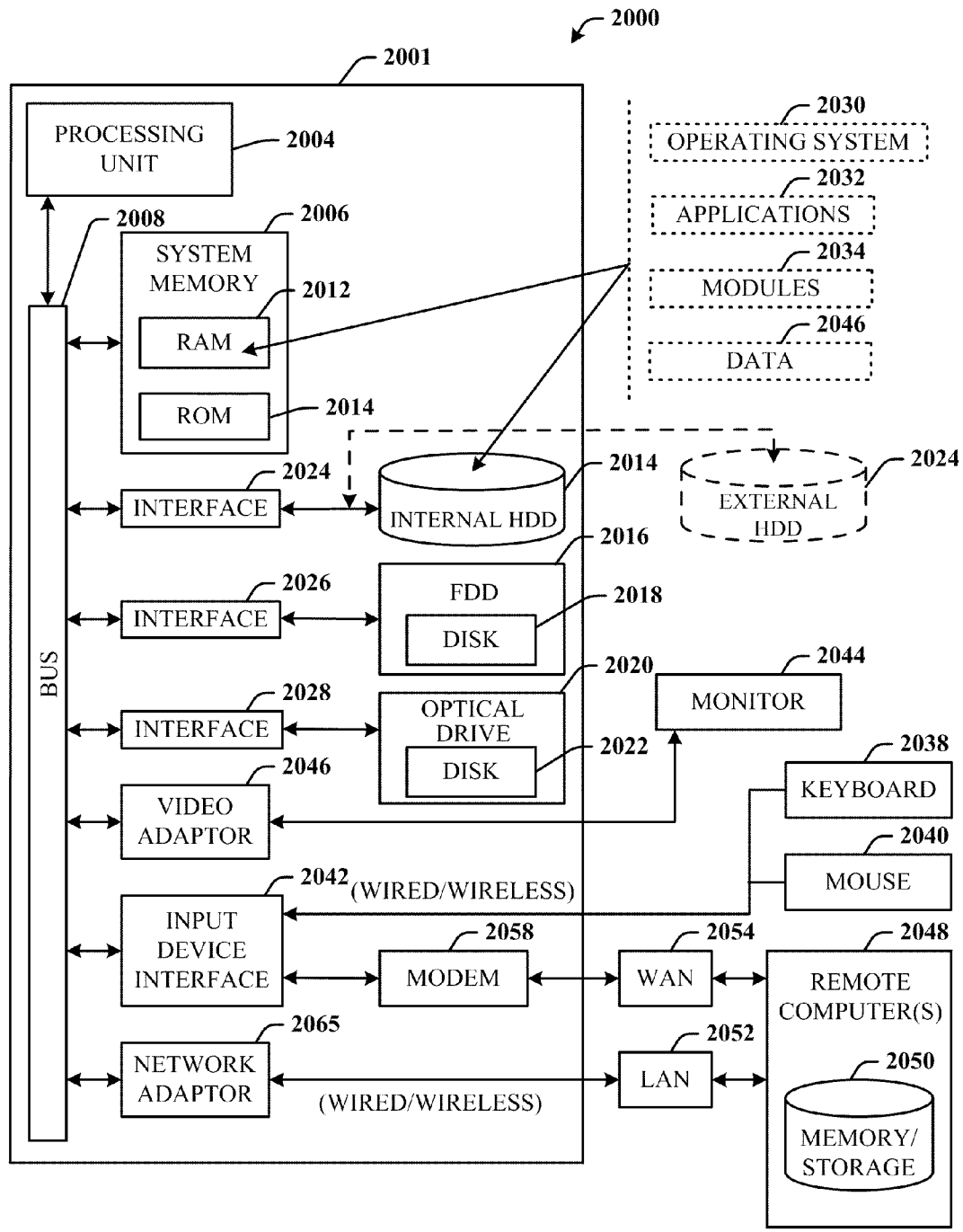
FIG. 20 illustrates a block diagram of a computer operable to execute the disclosed interference adaptation platform and MAC adaptation platform.

Referring now to FIG. 20, there is illustrated a block diagram of a computer operable to provide networking and communication capabilities between a wired or wireless communication network and a server and/or communication device. In order to provide additional context for various aspects thereof, FIG. 20 and the following discussion are intended to provide a brief, general description of a suitable computing environment 2000 in which the various aspects of the innovation can be implemented. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

A computer typically includes a variety of computer readable media. Computer readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 20, the exemplary environment 2000 for implementing various aspects includes a computer 2002, the computer 2002 including a processing unit 2004, a system memory 2006 and a system bus 2008. The system bus 2008 couples system components including, but not limited to, the system memory 2006 to the processing unit 2004. The processing unit 2004 can be any of various commercially available processors. Dual microprocessors and other multi processor architectures can also be employed as the processing unit 2004.

The system bus 2008 can be any of several types of bus structure that can further interconnect to a memory bus (with or without a memory controller), a peripheral bus, and a local bus using any of a variety of commercially available bus architectures. The system memory 2006 includes read-only memory (ROM) 2010 and random access memory (RAM) 2012. A basic input/output system (BIOS) is stored in a non-volatile memory 2010 such as ROM, EPROM, EEPROM, which BIOS contains the basic routines that help to transfer information between elements within the computer 2002, such as during start-up. The RAM 2012 can also include a high-speed RAM such as static RAM for caching data.

The computer 2002 further includes an internal hard disk drive (HDD) 2014 (e.g., EIDE, SATA), which internal hard disk drive 2014 can also be configured for external use in a suitable chassis (not shown), a magnetic floppy disk drive (FDD) 2016, (e.g., to read from or write to a removable diskette 2018) and an optical disk drive 2020, (e.g., reading a CD-ROM disk 1022 or, to read from or write to other high capacity optical media such as the DVD). The hard disk drive 2014, magnetic disk drive 2016 and optical disk drive 2020 can be connected to the system bus 2008 by a hard disk drive interface 2024, a magnetic disk drive interface 2026 and an optical drive interface 2028, respectively. The interface 2024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 2002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 2012, including an operating system 2030, one or more application programs 2032, other program modules 2034 and program data 2036. All or portions of the operating system, applications, modules, and/or data can also be cached in the RAM 2012. It is to be appreciated that the innovation can be implemented with various commercially available operating systems or combinations of operating systems.

A user can enter commands and information into the computer 2002 through one or more wired/wireless input devices, e.g., a keyboard 2038 and a pointing device, such as a mouse 2040. Other input devices (not shown) may include a microphone, an IR remote control, a joystick, a game pad, a stylus pen, touch screen, or the like. These and other input devices are often connected to the processing unit 2004 through an input device interface 2042 that is coupled to the system bus 2008, but can be connected by other interfaces, such as a parallel port, an IEEE 2394 serial port, a game port, a USB port, an IR interface, etc.

A monitor 2044 or other type of display device is also connected to the system bus 2008 through an interface, such as a video adapter 2046. In addition to the monitor 2044, a computer typically includes other peripheral output devices (not shown), such as speakers, printers, etc.

The computer 2002 can operate in a networked environment using logical connections by wired and/or wireless communications to one or more remote computers, such as a remote computer(s) 2048. The remote computer(s) 2048 can be a workstation, a server computer, a router, a personal computer, portable computer, microprocessor-based entertainment appliance, a peer device or other common network node, and typically includes many or all of the elements described relative to the computer 2002, although, for purposes of brevity, only a memory/storage device 2050 is illustrated. The logical connections depicted include wired/wireless connectivity to a local area network (LAN) 2052 and/or larger networks, e.g., a wide area network (WAN) 2054. Such LAN and WAN networking environments are commonplace in offices and companies, and facilitate enterprise-wide computer networks, such as intranets, all of which may connect to a global communications network, e.g., the Internet.

When used in a LAN networking environment, the computer 2002 is connected to the local network 2052 through a wired and/or wireless communication network interface or adapter 2056. The adaptor 2056 may facilitate wired or wireless communication to the LAN 2052, which may also include a wireless access point disposed thereon for communicating with the wireless adaptor 2056.

When used in a WAN networking environment, the computer 2002 can include a modem 2058, or is connected to a communications server on the WAN 2054, or has other means for establishing communications over the WAN 2054, such as by way of the Internet. The modem 2058, which can be internal or external and a wired or wireless device, is connected to the system bus 2008 through the serial port interface 2042. In a networked environment, program modules depicted relative to the computer 2002, or portions thereof, can be stored in the remote memory/storage device 2050. It will be appreciated that the network connections shown are exemplary and other means of establishing a communications link between the computers can be used.

It is to be understood that aspects described herein may be implemented by hardware, software, firmware, or any combination thereof. When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the s and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform functions described herein.

Further, the s and/or actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the s and/or actions of a method or algorithm may reside as one or any combination or set of codes and/or instructions on a machine-readable medium and/or computer readable medium, which may be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:
1. A method, comprising:
    receiving, by a computing device comprising a processor, samples of performance parameters associated with respective access point devices under different resource assignment configurations, wherein the performance parameters comprise a noise level parameter, a channel utilization parameter, a packet error probability and a busy time ratio;
    classifying, by the computing device, the respective access point devices as normal, interfered, or heavily loaded, under the different resource assignment configurations, based on the samples of performance parameters;
    identifying, by the computing device, a resource assignment configuration of the different resource assignment configurations that increases a percentage of the respective access point devices having a classification of normal; and assigning, by the computing device, resources to the respective access point devices based on the resource assignment configuration.

2. The method of claim 1, wherein the classifying includes employing step-wise optimal hierarchical clustering.

3. The method of claim 1, wherein the busy time ratio comprises an amount of time a device communicates with an access point device of the respective access point devices over a defined time period.

4. The method of claim 1, wherein the classifying includes:
employing unsupervised step-wise optimal hierarchical clustering using the samples of performance parameters to determine mean normal values, mean interfered values, and mean heavily loaded values for the respective access point devices under the different resource assignment configurations; and
employing the mean normal values, the mean interfered values, and the mean heavily loaded values in the classifying.

5. The method of claim 1, wherein the access point devices are part of a wireless fidelity network.

6. A method, comprising:
facilitating setting a first access point device of a set of access point devices to a plurality of different resource block assignments;
measuring first samples of performance parameters for respective access point devices in the set under the plurality of different resource block assignments, wherein the performance parameters comprise a noise level, a channel utilization, a packet error probability and a busy time ratio;
classifying the respective access point devices as normal, interfered, or heavily loaded under the plurality of different resource block assignments using the first samples; and
facilitating resetting the first access point device to a resource block assignment of the plurality of different resource block assignments that facilitates increasing a percentage of the respective access point devices classified as normal.

7. The method of claim 6, wherein the classifying includes employing step-wise optimal hierarchical clustering.

8. The method of claim 6, further comprising:
setting a second access point device of the set of access point devices to another plurality of different resource block assignments;
measuring second samples of the performance parameters for the respective access point devices under the other plurality of different resource block assignments;
classifying the respective access point devices as normal, interfered, or heavily loaded under the other plurality of different resource block assignments using the second samples; and
resetting the second access point device to a resource block assignment of the plurality of other resource block assignments that facilitates increasing the percentage of the respective access point devices classified as normal.

9. The method of claim 8, wherein the classifying the respective access point devices comprises:
employing unsupervised step-wise optimal hierarchical clustering using the first and second samples to determine mean normal values, mean interfered values, and mean heavily loaded values for the respective access point devices; and
employing the mean normal, the mean interfered, and the mean heavily loaded values in the classifying.

10. The method of claim 6, wherein the respective access point devices are part of a wireless fidelity network.

11. A system, comprising:
a memory that stores executable components; and
a processor, coupled to the memory, that executes or facilitates execution of the executable components, comprising:
a measurement component configured to measure samples of performance parameters for respective access points under different resource assignment configurations, wherein the performance parameters comprise a noise level, a channel utilization, a packet error probability and a busy time ratio;
a classification component configured to classify as normal, interfered, or heavily loaded, the respective access points under the different resource assignment configurations based on the samples; and
an optimization component configured to select a resource assignment configuration of the different resource assignment configurations that increases a percentage of the respective access points having a classification of normal and assign resources to the respective access points based on the resource assignment configuration.

12. The system of claim 11, wherein the busy time ratio comprises an amount of time a device communicates with an access point of the respective access points over a defined time period.

13. The system of claim 11, wherein the classification component is configured to employ step-wise optimal hierarchical clustering of the samples to determine respective mean normal values, respective mean interfered values, and respective mean heavily loaded values for the respective access points, and employ the respective mean normal values, the respective mean interfered values, and the respective mean heavily loaded values for the respective access points to classify the respective access points.

14. The system of claim 11, wherein the respective access points are part of a wireless fidelity network.

15. A non-transitory computer readable storage medium comprising executable instructions that, in response to execution, cause a system comprising a processor to perform operations, comprising:
measuring samples of performance parameters respectively associated with access points under different resource assignment configurations, wherein the performance parameters comprise noise level, channel utilization, packets error probability and busy time ratio;
classifying each of the access points as normal, interfered, or heavily loaded, under the different resource assignment configurations based on the samples;
identifying a resource assignment configuration that increases a percentage of the access points having a classification of normal; and
assigning resources to the access points based on the resource assignment configuration.

16. The non-transitory computer readable storage medium of claim 15, wherein the busy time ratio comprises an amount of time a device communicates with an access point of the access points over a defined time period.

17. The non-transitory computer readable storage medium of claim 15, wherein the classifying includes employing step-wise optimal hierarchical clustering of the samples to determine a mean normal value, a mean interfered value, and a mean heavily loaded value for each of the access points, and employ the mean normal value, the mean interfered value, and the mean heavily loaded value for each of the access points to classify the access points.

18. The method of claim 1, wherein a classification of interfered represents a level of interference associated with one of the respective access point devices being above an interference threshold, a classification of heavily loaded represents a load associated with the one of the respective access point devices being above a load threshold and the classification of normal represents the level of interference associated with the one of the respective access point devices being within the interference threshold and the load associated with the one of the respective access point devices being within the load threshold.

19. The method of claim 1, wherein the respective access point devices are configured to operate using a plurality of different antenna patterns and a plurality of different channels, and wherein a resource assignment configuration comprises, for the respective access point devices, assignment of one of the plurality of different antenna patterns and one of the plurality of different channels.

20. The method of claim 1, wherein the assigning the resources comprises assigning the respective access point devices to respective antenna patterns and channels defined by the different resource assignment configurations.

21. The method of claim 6, wherein a classification of interfered represents a level of interference associated with an access point device of the respective access point devices being above an interference threshold, a classification of heavily loaded represents a load of the access point device being above a load threshold and a classification of normal represents the level of interference associated with the access point device being within the interference threshold and the load associated with the access point device being within the load threshold.

22. The method of claim 6, wherein the set of access point devices are respectively configured to operate using a plurality of different antenna patterns and a plurality of different channels, and wherein a resource block assignment of the plurality of different resource block assignments comprises assignment of one of the plurality of different antenna patterns and one of the plurality of different channels.

23. The method of claim 6, wherein the resetting the first access point device to the resource block assignment comprises setting the first access point device to an antenna pattern and channel combination of a plurality of different antenna pattern and channel combinations represented by the plurality of different resource block assignments.

24. The system of claim 11, wherein a classification of interfered represents a level of interference associated with an access point of the respective access points being above an interference threshold, a classification of heavily loaded represents a load of the access point being above a load threshold and the classification of normal represents the level of interference associated with the access point within the interference threshold and the load associated with the access point being within the load threshold.

25. The system of claim 11, wherein the respective access points are configured to operate using a plurality of different antenna patterns and a plurality of different channels, and wherein a resource assignment configuration comprises, for the respective access points, assignment of respective ones of the plurality of different antenna patterns and respective ones of the plurality of different channels.

26. The system of claim 11, wherein the optimization component is configured to assign the respective access points to respective antenna patterns and channels defined by the different resource assignment configurations.

27. The non-transitory computer readable storage medium of claim 15, wherein a classification of interfered represents a level of interference associated with an access point of the access points being above an interference threshold, a classification of heavily loaded represents a load of the access point being above a load threshold and the classification of normal represents the level of interference associated with the access point being within the interference threshold and the load associated with the access point being within the load threshold.

28. The non-transitory computer readable storage medium of claim 15, wherein the access points are respectively configured to operate using a plurality of different antenna patterns and a plurality of different channels, and wherein a resource assignment configuration comprises, for respective ones of the access points, assignment of a respective one of the plurality of different antenna patterns and a respective one of the plurality of different channels.

29. The non-transitory computer readable storage medium of claim 15, wherein the assigning the resources comprises assigning the access points to respective antenna patterns and channels defined by the resources assignments configuration.

30. An access point device, comprising:
a memory to store executable instructions; and
a processor, coupled to the memory, that executes or facilitates execution of the executable instructions to perform operations, comprising:
measuring samples of performance parameters under conditions of a plurality of different resource block assignments, wherein the performance parameters comprise a noise level, a channel utilization, a packet error probability and a busy time ratio;
determining a classification of the access point device as normal, interfered, or heavily loaded under the conditions of the plurality of different resource block assignments, respectively, using the samples; and
selecting one of the resource block assignments that maximizes a percentage of access point devices classified as normal amongst a set of access point devices, wherein the access point device is included in the set of access point devices.

31. The access point device of claim 30, wherein the classifying includes employing step-wise optimal hierarchical clustering.

32. The access point device of claim 30, wherein a classification of interfered represents a level of interference associated with one of the access point devices being above an interference threshold, a classification of heavily loaded represents a load of the one of the access point devices being above a load threshold and a classification of normal represents the level of interference associated with the one of the access point devices being within the interference threshold and the load associated with the one of the access point devices being within the load threshold.

33. The access point device of claim 30, wherein the access point devices are respectively configured to operate using a plurality of different antenna patterns and a plurality of different channels, and wherein a resource block assignment of the plurality of different resource block assignments comprises assignment of a respective one of the plurality of different antenna patterns and a respective one of the plurality of different channels.

34. The access point device of claim 30, wherein the set of access point devices are classified as normal, interfered, or heavily loaded under the plurality of different resource block assignments based on measurement data collected for the set of access point devices under the conditions of the plurality of different resource block assignments.

* * * * *